(12) United States Patent
Hopper

(10) Patent No.: US 9,636,605 B2
(45) Date of Patent: May 2, 2017

(54) METHOD AND APPARATUS FOR FLUID SEPARATION

(71) Applicant: Cameron International Corporation, Houston, TX (US)

(72) Inventor: Hans Paul Hopper, Aberdeen (GB)

(73) Assignee: OneSubsea IP UK Limited, London (GB)

( * ) Notice: Subject to any disclaimer, the term of this patent is extended or adjusted under 35 U.S.C. 154(b) by 21 days.

(21) Appl. No.: 13/964,261

(22) Filed: Aug. 12, 2013

(65) Prior Publication Data

US 2013/0327726 A1    Dec. 12, 2013

Related U.S. Application Data

(62) Division of application No. 13/610,065, filed on Sep. 11, 2012, now Pat. No. 8,529,772, which is a division
(Continued)

(30) Foreign Application Priority Data

Feb. 25, 2006    (GB) .................................. 0603811.1

(51) Int. Cl.
    *B01D 17/02*    (2006.01)
    *B01D 19/00*    (2006.01)
    (Continued)

(52) U.S. Cl.
    CPC ..... *B01D 17/0217* (2013.01); *B01D 19/0057* (2013.01); *B01D 19/0094* (2013.01);
    (Continued)

(58) Field of Classification Search
    CPC ............ B01D 17/0217; B01D 19/0094; B01D 19/0057; B04C 5/08; B04C 3/00;
    (Continued)

(56) References Cited

U.S. PATENT DOCUMENTS 2,413,324 A * 12/1946 Holzwarth ................ B04C 3/00
                                                       55/452
3,695,509 A * 10/1972 Javet .................. B01D 17/0217
                                                       494/43
(Continued)

FOREIGN PATENT DOCUMENTS

EP          0400202 A2    12/1990
EP          0475338 A1     3/1992
(Continued)

OTHER PUBLICATIONS

Combined Search and Examination Report for GB0816320.6 dated Dec. 16, 2008, pp. 1-7.
(Continued)

*Primary Examiner* — David C Mellon
(74) *Attorney, Agent, or Firm* — Chamberlain Hrdlicka

(57) ABSTRACT

A method and apparatus are disclosed for separating a multiphase fluid stream that includes a heavier fluid component and a lighter fluid component. The fluid flows along a first helical flowpath with a first pitch. The first helical flowpath is sufficiently long to establish a stabilised rotating fluid flow pattern for the stream. The uniform rotating fluid also flows along a second helical flowpath, the second helical flowpath having a second pitch greater than the first pitch. The lighter fluid is removed from a radially inner region of the second helical flowpath. The method and apparatus are particularly suitable for the separation of oil droplets from water, especially from water for reinjection into a subterranean formation as part of an oil and gas production operation. The method and apparatus are conveniently applied on a modular basis.

4 Claims, 12 Drawing Sheets

Related U.S. Application Data of application No. 12/280,664, filed as application No. PCT/GB2007/000601 on Feb. 22, 2007, now Pat. No. 8,286,805.

(51) Int. Cl.
*B04C 3/04* (2006.01)
*B04C 5/08* (2006.01)
*E21B 43/36* (2006.01)
*E21B 43/34* (2006.01)
*E21B 43/38* (2006.01)
*B04C 3/00* (2006.01)
*B04C 5/13* (2006.01)
*B04C 5/103* (2006.01)

(52) U.S. Cl.
CPC .............. *B04C 3/00* (2013.01); *B04C 3/04* (2013.01); *B04C 5/08* (2013.01); *B04C 5/103* (2013.01); *B04C 5/13* (2013.01); *E21B 43/34* (2013.01); *E21B 43/36* (2013.01); *E21B 43/38* (2013.01); *B04C 2003/006* (2013.01)

(58) Field of Classification Search
CPC .. B04C 3/04; B04C 5/13; B04C 5/103; B04C 2003/006; B04C 2003/003; B04C 5/081; B04C 5/26; E21B 43/38; E21B 43/36; E21B 43/34; E21B 43/385; E21B 43/40
See application file for complete search history.

(56) References Cited

U.S. PATENT DOCUMENTS

| | | | |
|---|---|---|---|
| 3,989,628 A | 11/1976 | Bier | |
| 4,531,584 A | 7/1985 | Ward | |
| 4,666,476 A * | 5/1987 | Reeve et al. | 96/216 |
| 4,834,887 A * | 5/1989 | Broughton | 210/512.1 |
| 4,855,050 A * | 8/1989 | Senyard et al. | 210/512.1 |
| 4,859,347 A | 8/1989 | Simon et al. | |
| 4,900,433 A | 2/1990 | Dean et al. | |
| 5,024,002 A | 6/1991 | Possati | |
| 5,037,558 A | 8/1991 | Kalnins | |
| 5,149,341 A | 9/1992 | Taylor | |
| 5,466,384 A * | 11/1995 | Prevost et al. | 210/787 |
| 6,036,749 A | 3/2000 | Ribeiro et al. | |
| 6,039,116 A | 3/2000 | Stevenson et al. | |
| 6,113,675 A | 9/2000 | Branstetter et al. | |
| 6,564,865 B1 * | 5/2003 | Brady | E21B 43/385 166/105.3 |
| 6,723,158 B2 | 4/2004 | Brown et al. | |
| 2004/0154272 A1 | 8/2004 | McKenzie | |
| 2006/0186038 A1* | 8/2006 | Nassif | B01D 17/0217 210/512.1 |
| 2009/0139938 A1 | 6/2009 | Larnholm et al. | |

FOREIGN PATENT DOCUMENTS

| | | |
|---|---|---|
| EP | 0654292 A2 | 5/1995 |
| GB | 2220374 A | 1/1990 |
| WO | 9320331 A | 10/1993 |
| WO | 0100296 A1 | 1/2001 |
| WO | WO 2004/096406 A1 * | 11/2004 |

OTHER PUBLICATIONS

International Search Report and Written Opinion dated Nov. 30, 2007 for PCT Application No. PCT GB2007/000601 filed Feb. 22, 2007.

* cited by examiner $$h_w = \frac{(P_S - P_H)}{(d_w - d_o)}$$

METHOD AND APPARATUS FOR FLUID SEPARATION

CROSS REFERENCE TO RELATED APPLICATIONS

This application is a divisional of U.S. patent application Ser. No. 13/610,065 filed Sep. 11, 2012 entitled "Method and Apparatus for Fluid Separation," which is a divisional of U.S. Pat. No. 8,286,805 filed Oct. 15, 2008 entitled "Method and Apparatus for Fluid Separation," which is a National Phase under 35 U.S.C. §371 of International Application No. PCT/GB2007/000601, filed Feb. 22, 2007, entitled "Method and Apparatus for Fluid Separation," which claims the benefit of United Kingdom Patent Application No. 0603811.1, filed Feb. 25, 2006, entitled "Method and Apparatus for Fluid Separation," which are incorporated herein by reference in their entirety for all purposes.

The present invention relates to a method and apparatus for the separation of multiphase fluid streams. The method and apparatus find particular application in the separation of multiphase liquid streams, especially the separation of hydrocarbon liquids from water. The method and apparatus are particularly suitable for the purification of water produced from subterranean oil and gas wells.

Hydrocarbons produced from a subterranean well, such as oil and gas, are accompanied by quantities of other materials, including water. In some cases, the volume of water produced from a well can be significant. In many situations, the produced water is disposed of by being reinjected underground, either into the same well from which it is produced, or a neighbouring well. The requirements for the purity of the water being reinjected in such a manner are strict. In particular, it is important that the solids content of the water is low and that the water contains a minimal amount of entrained oil. In general, it is required that the water for reinjection contains less than 400 ppm oil and less than 2 ppm sand. Still lower values may be required in certain locations. These requirements must be met in order to prevent the well from becoming plugged and to meet legal requirements pertaining to water reinjection.

Conventional techniques for cleaning and purifying the water produced from wells ready for reinjection rely upon the use of settling tanks, into which the mixed fluid stream is fed and separation of the lighter oil fraction from the denser water fraction takes place under the action of gravity. The very small size of the oil droplets entrained in the water requires a long residence time in a settling vessel in order for gravity separation to be effective. This in turn requires the vessel to be of a large volume. Such a large vessel would be costly to manufacture and install close to the wellhead in a subsea location. Indeed, it may not be feasible to manufacture a vessel with sufficient burst or collapse strength to operate under the hydrostatic pressures encountered at many deep water wellhead locations. Accordingly, settling vessels are generally located at the surface, on a fixed or floating platform. This necessitates providing suitable pipework to transfer the water from the seabed to the surface and return the polished water to the seabed for reinjection. In addition, due to their size, the settling vessels occupy a large volume of space on the surface structure, space which is very often at a premium. A further problem is that the separation efficiency of the settling tanks is generally low and only approaches acceptable levels after excessively long residence times for the water in the tank. This in turn increases the volume of the tank further. Accordingly, there is a need for an improved system for purifying produced water to render it suitable for reinjection.

An alternative technique for removing oil from water is the use of a hydrocyclone, often referred to in the art as "de-oilers." These devices are advantageous in having a high separation efficiency compared with gravity separation, being compact and an absence of moving parts. One arrangement of hydrocyclones is a tiered or series assembly. The first cyclone in the series is a bulk oil-water cyclone (BOW), in which the oil concentration of the feed is reduced from as much as 50% to 15%, by volume. The water is then passed to a pre-de-oiler cyclone (PDC), in which the concentration of oil is further reduced to about 0.2%. The final stage of cyclone separation is the de-oiler. A problem exists in that the hydrocyclones are effective as de-oilers only at low liquid flow rates. For example, a typical maximum throughput is of the order of 1200 barrels per day (bpd). However, it is necessary for the de-oiler assembly to operate over a much wider range of flowrates, for example up to 40,000 bpd. Known hydrocyclone technology does not allow the cyclone de-oiler to operate over such a wide range of flowrates and achieve a consistently high separation efficiency.

Accordingly, there is a need for an improved separation system that is able to achieve a high separation efficiency over a wide range of fluid flowrates. It would also be very advantageous if the system was able to be located at the wellhead at a subsea location, where the fluid leaving the well has the highest temperature and the least viscosity.

EP 1 352 679 discloses a separator for separating a multiphase flow, the separator comprising an inlet for a multiphase fluid, a plurality of outlets, with at least one outlet being provided for each separated phase, and a main annular tubular bore. The separator operates to separate lighter and heavier components by causing the fluid to flow in a rotational path. While this separator is particularly effective in separating multiple fluid phases, such as gas, oil and water, it cannot guarantee the high separation efficiency required in order to purify produced water sufficiently to allow for reinjection. In particular, sufficient oil droplets remain in the water product of this separator to prevent the water from being reinjected directly into an underground formation. In order to further purify the water, it is necessary to provide a system that is low in shear, such that the remaining minute droplets of oil are not emulsified with the water fraction, as such emulsification would make further separation very difficult, if not impossible within a reasonable time frame.

GB 2 374 028 A discloses a separator for oil and water mixtures employing a vortex separator to remove the bulk of the oil from the water. The resultant oil/water mixture is passed through a stack of tilted plates to remove further oil droplets from the water. The system of GB 2 374 028, while capable of separating oil from water, is not capable of providing sufficient separation for the water to be reinjected into an underground formation.

Accordingly, there is a need for an improved separation technique to enable multiphase fluid streams to be separated, in particular streams of water and oil, such that the water may be sufficiently cleaned of oil to allow for reinjection into an underground formation.

According to the present invention, there is provided in a first aspect, a method for separating a multiphase fluid stream comprising a heavier fluid component and a lighter fluid component, the method comprising causing the fluid to flow along a helical flowpath in which the critical Reynolds number of the fluid flow is elevated, the fluid stream flowing at a Reynolds number below the elevated critical number, the fluid stream flowing at a sufficient velocity to cause the fluid phases to separate.

The first aspect of the present invention employs the phenomenum that a fluid forced to flow in a confined conduit, such as between two plates or the like, exhibits different flow regimes to the same fluid flowing in an open conduit or a pipe. In particular, the forced fluid flow exhibits a significantly increased critical Reynolds number, that is the Reynolds number at which turbulent flow begins. This in turn allows the fluid velocity to be significantly increased, while still maintaining a non-turbulent flow regime. References to an "elevated critical Reynolds number" are to be construed accordingly.

By forming the helical flowpath so as to give rise to an elevated critical Reynolds number, the rotational velocity of the fluid can be significantly increased, enhancing the separation of the different phases. Preferably, the critical Reynolds number is greater than 10,000, more preferably greater than 100,000.

In a second aspect, the present invention provides a method for separating a multiphase fluid stream comprising a heavier fluid component and a lighter fluid component, the method comprising causing the fluid to flow along a helical flowpath extending around a central conduit, the fluid flowing at a sufficient velocity to cause the lighter fluid component to move to the inner region of the helical flowpath; and collecting the lighter fluid component in the central conduit.

Preferably, the method of this aspect utilises the aforementioned principle of elevating the Reynolds number of the fluid stream. The critical Reynolds number of the fluid flow is elevated, while the fluid stream is maintained flowing at a Reynolds number below the elevated critical number.

In a further aspect, the present invention provides a method for separating a multiphase fluid stream comprising a heavier fluid component and a lighter fluid component, the method comprising: causing the fluid to be forced along a first helical flowpath, the first helical flowpath having a first pitch, the first helical flowpath being sufficiently long to establish a stabilised rotating fluid flow pattern for the stream; causing the uniform rotating fluid to flow along a second helical flowpath, the second helical flowpath having a second pitch, wherein the second pitch is greater than the first pitch; and removing the lighter fluid from a radially inner region of the second helical flowpath.

The method of the present invention is suitable for the separation of any multiphase fluid stream, including streams comprising one or more liquid phases and one or more gas phases. The method is particularly suitable for the separation of multiphase liquid-liquid streams. The method is particularly advantageous in its efficiency at separating liquid hydrocarbons, especially crude oil, from aqueous streams. One application of the method is the separation of crude oil from water produced from a subterranean well, prior to the reinjection of the produced water into an underground formation.

The method is particularly suitable for separating a minor fraction of a dispersed first fluid from the bulk or continuous phase of a second fluid. Preferably, the lighter fluid fraction is the dispersed phase.

In the first step of the separation method, the incoming fluid is divided into manageable portions allowing a suitable flow rate to be achieved. The or each portion is preferably first caused to tangentially enter a separator region, thereby imparting sufficient rotational velocity on the fluid to cause the phases to begin to congregate. In this cylinder separation, the phases in the stream congregate and coalesce, thereby allowing the dispersed phase to form as larger droplets.

The fluid stream is then caused to rotate in a compact helix under pressure, so that the fluid is subjected to a high centrifugal force, allowing the fluid to form a stable rotating flow pattern. In order to avoid the different fluid phases from becoming further mixed, in particular emulsified, the fluid stream is stabilised into a flow regime that is below the critical Reynolds number (that is the Reynolds number above which the flow regime is turbulent). The critical Reynolds number will depend upon such factors as the viscosity and density of the fluid stream, the velocity of the fluid stream and the dimensions of the conduit through which the stream is passing. Preferably, the fluid is stabilised in a transient flow regime, thus keeping the droplets of the dispersed fluid phase active. In the present invention, the compact helix is arranged such that the Reynolds number can be significantly higher than the usual critical number, while still having the fluid in a laminar or transitional flow regime. Such an effect, generated for example when a fluid is caused to flow between two facing plates, is known in the art. This effect is employed in the present invention, in order to allow a high rotational fluid velocity to be achieved, while maintaining the fluid in a non-turbulent flow regime. In this way, the separation of the various phases due to the centrifugal forces is enhanced.

The length of the first helical flowpath should be of sufficient length to allow the fluid flow to centrifugally establish and stabilise in the required flow regime, most preferably a transient flow regime. The nature of the fluid stream, its components and the flow regime of the fluid being processed in the method will determine the length of the first helical flowpath. If the required flow regime can be established quickly, the first helical flowpath will be correspondingly short.

Once a stabilised flow regime has been established, the fluid stream is caused to flow along a first helical flowpath. In this step, the fluid is acted upon by a centrifugal force to create a multiple gravity force, as a result of being forced to flow along the helical path, the effect of which is to cause the heavier fluid to be forced to the outer cylindrical wall and the lighter fraction or fractions to migrate to the inner region of the helix. The helical flowpath has a first pitch. It is preferable that the pitch of the helical flowpath remains constant throughout the length of the first helical flowpath, as the fluid flow is being pressurised through the helix plates.

Thereafter, the fluid stream is led into a second helical flowpath, from which the lighter fluid phase is recovered. The second helical flowpath has a second pitch that is greater than the pitch of the first helical flowpath. The second pitch may be constant throughout the length of the second helical flowpath. However, in order to reduce friction losses in the fluid stream as a result of back-pressure, it is preferred that the cross-section area of the second helical flowpath increases along its length. This is most conveniently achieved by having the pitch of the second helical flowpath increase along its length. The pitch may increase step-wise or gradually. In one preferred embodiment, the pitch of the second helical flowpath increases continuously along the length of the second helical flowpath. In a preferred arrangement, the pitch increases by up to 5% for each turn of the fluid flowpath around the longitudinal axis of the flowpath, more preferably up to 3%, especially about 1% for each turn. In this way, a flow regime is maintained that allows the lighter fluid fractions to migrate to the inner region of the helical flowpath, from where they are removed.

The second helical flowpath should be long enough to allow the lighter fluid phases to be collected and removed from the fluid stream. Small droplets of the lighter fluid may remain in the bulk heavier fluid phase. If so, and the desired or required level of fluid purity has not been achieved, further processing stages may be employed, as follows.

Should further separation and purification be required, the method may comprise further steps, in which the rotational velocity of the fluid stream is increased so as to generate a central vortex of lighter fluid fractions, from which light fluid may be withdrawn. The increase in rotational velocity may be achieved using a third helical flowpath, along which the cross-sectional area of the flowpath is adjusted so as to cause the increase in fluid velocity required to generate the vortex. In one preferred arrangement, the pitch of the third helical flowpath increases in the direction of flow. The increase in pitch may be stepwise or continuous. Preferably, the pitch of the third helical flowpath increases along substantially its entire length. In order to generate the required increase in fluid velocity, the helical flowpath narrows in width in the radial direction, as the pitch increases. The increase in fluid velocity is preferably controlled such that the critical Reynolds number of the fluid flow is not exceeded. The cross-sectional area of the third helical flowpath is such that excessive friction losses and back-pressure are avoided.

After the increase in the rotational velocity, the fluid is ejected from the third helical flowpath in the form of a rotating annulus wall of fluid, which contains a rotating core of fluid. Within the rotating core of fluid, a separation vortex is established. In this stage, the remaining lighter fluid is caused to migrate towards and into the vortex, with the heavier fluid circulating in the annular region extending around the established vortex. At this point, a helical flowpath need not be provided and the aforementioned flow regimes and the vortex can be established in an open conduit, such as a tube or pipe. In this way, the vortex is established at the exit of the second helical flowpath.

In many cases, the vortex induced in this way is relatively short, in comparison with the length of the surrounding conduit. In such cases of a short vortex, the stability of the vortex may be reduced, leaving the vortex susceptible to minor changes in the flowrate of the fluid. Accordingly, it is preferred to provide a means for stabilising the vortex. In one preferred embodiment, the vortex is formed beneath a conduit for removing the lighter fluid that has migrated to and collected in the vortex. A preferred means for capturing and stabilising the vortex is a guide cone and guide conduit of suitable dimensions disposed within the conduit in the region of its opening into the vortex. In this way, the vortex is stabilised both within the entry region of the conduit and in the bulk fluid.

The fluid stream leaving the vortex separation region will contain little or no lighter components and will consist mainly of the heavier fluid components. Should some lighter components remain, further separation steps may be carried out as follows.

In a preferred embodiment of the present invention, the method further comprises introducing the fluid stream into a fluid-fluid settling region, in which the lighter fluid components are separated from the heavier fluid components under the action of gravity. The velocity of the fluid stream in the fluid-fluid settling region is significantly lower than in the previous separation regions or zones. In particular, the velocity is such that the Reynolds number of the fluid stream is well below the critical Reynolds number, most preferably in the laminar flow regime.

Preferably, the fluid stream is caused to rotate in the fluid-fluid settling region. This is most advantageously achieved by having the rotation imparted to the fluid stream upon exiting the vortex separation region. While the major separation effect in this region is the gravity separation, the rotational flow regime will cause the lighter fluid components to concentrate in the central or innermost zone of the region, allowing for an easier removal and improved separation.

To assist with the separation of any remaining lighter fluid components, the method preferably comprises centralising the rotational flow of the fluid stream within the fluid-fluid settling region. This is preferably achieved in a manner in which the cross-sectional area of the fluid flow path in the fluid-fluid settling region is reduced in the direction of flow.

In one preferred arrangement, fluid richer in the lighter fluid component is removed from the lower central region of the fluid-fluid settling region and passed to the upper central region of the fluid-fluid settling region. To prevent remixing at the exiting vortex region, an axial cowling may be provided to enable the lighter fluid droplets to move to the lighter fluid region unhindered by the rotating bulk phase. In this way the separation of the lighter and heavier components is enhanced. In particular, the lighter components are moved to the upper portion of the settling region, which is already relatively rich in the lighter components, with the heavier components thus transported returning to the lower portion under the effects of gravity.

Monitoring, fluid sampling and fluid injection ports and lines may be provided that terminate at appropriate locations within the system. For example, lines may be provided to inject pressurised gas or a gas-fluidised liquid to cause upwardly moving bubbles to ascend through the heavier fluid phase. This would assist with the predominantly gravity separation effect. In particular light phases, such as oil and other hydrocarbons may adhere to the surface of the gas bubbles and then be carried at a faster rate to the lighter fluid regions, as is commonly employed in floatation separation processes.

If desired, the separation of the lighter fluid component from the heavier fluid components may be enhanced by the addition of additives active in inducing droplet coalescence of the lighter fluid component. Suitable additives are well known in the art and are commercially available. Scale inhibitors may be applied to prevent the formation of scale, in particular in locations where there is a significant pressure drop in the fluid stream, such as in the inlet to the system of the present invention. Demulsifiers may be added upstream of the first stage of separation, in order to enhance the separation of the fluid phases. Corrosion inhibitors may be required in the system of present invention, in particular downstream of the helical separation assemblies. Coalescers may be introduced as required in the system in order to promote the aggregation of fluid phases. Wax inhibitors may be required when oil is present as one of the fluid phases, in order to prevent the crystallisation of high molecular weight wax compounds in the regions of high oil concentration. Other additives that may be employed include friction reducers, hydrate inhibitors and biocides.

The remaining fluid in the process will consist almost entirely of the heavier component or components. These are preferably passed to a fluid removal region, in which a fluid stream consisting essentially of the heavier fluid component is removed. The fluid stream is preferably caused to rotate in the fluid removal zone, the said fluid stream being removed from the central region of the fluid removal zone. In this way, any heavy components, such as sediment or the like, may be collected under the action of gravity and removed from the system, for example on a batch wise basis as sufficient sediment collects in a suitable receptacle.

A particular advantage of the method of the present invention is that it may be applied on a modular basis. In this way, a wide range of operating fluid flowrates may be accommodated and a separation process provided that may be applied for extended periods of time with significant variations in the fluid throughput. This is of particular advantage in the application of the method to separation in remote locations, especially subsea wellhead operations.

Accordingly, the present invention also provides a method for separating a multiphase fluid stream comprising a heavier fluid component and a lighter fluid component, the volume flowrate of the multiphase fluid stream being subject to variation over time, the method comprising providing a plurality of separation assemblies for carrying out the method steps of: allowing a stream of controlled flowrate to enter a dedicated separation assembly; establishing a stabilised rotating fluid flow pattern for the stream; causing the stabilised rotating fluid to be forced along a first helical flowpath, the first helical flowpath having a first pitch; causing the uniform rotating fluid to flow along a second helical flowpath, the second helical flowpath having a second pitch, wherein the second pitch is greater than the first pitch; and removing the lighter fluid from a radially inner region of the second helical flowpath; wherein the assemblies are operable to accommodate different fluid flowrates; and selecting one or more separation assemblies for carrying out the method steps according to the volume flowrate of the multiphase fluid stream.

The method steps carried out in each separation assembly may have any of the preferred or specific features hereinbefore described.

In one embodiment, the modular separation method further comprises providing a finishing assembly for carrying out the fluid-fluid settling steps described hereinbefore, wherein each of the plurality of separation assemblies is connected at its outlet to the finishing assembly.

In addition to the aforementioned method aspects of the present invention, there is also provided corresponding apparatus aspects. Thus, in a first aspect, the present invention provides an apparatus for separating a multiphase fluid stream comprising a heavier fluid component and a lighter fluid component, the apparatus comprising a helical flowpath having a fluid inlet, a first outlet for a heavier fluid component and a second outlet for a lighter fluid component, the helical flowpath being formed such that the critical Reynolds number of the fluid stream flowing along the helical flowpath is elevated.

Preferably, the second outlet for the lighter fluid component is disposed axially centrally of the helical path, in particular opening into an axially central lighter fluid conduit.

The helical flowpath may be arranged to provide the elevated critical Reynolds number hereinbefore described. In particular, this may be achieved by adjusting the internal dimensions of the helical flowpath according to the properties of the fluid stream to be processed.

In a further aspect, the present invention provides an apparatus for separating a multiphase fluid stream comprising a heavier fluid component and a lighter fluid component, the apparatus comprising: means for selecting a stream of fluid of predetermined flowrate; a first conduit for establishing a stabilised rotating fluid flow pattern for the fluid stream having a first helical flowpath, the first helical flowpath having a first pitch; a second conduit having second helical flowpath, the second helical flowpath having a second pitch, wherein the second pitch is greater than the first pitch; and means for removing the lighter fluid from a radially inner region of the second helical flowpath.

The apparatus comprises a first conduit having a helical passage therethrough, through which fluid may be caused to flow in a helical flowpath. In order to avoid the different fluid phases from becoming further mixed, in particular emulsified, the first conduit is preferably formed such that the fluid stream is stabilised into a flow regime that is below the critical Reynolds number (that is the Reynolds number above which the flow regime is turbulent). The critical Reynolds number will depend upon such factors as the viscosity and density of the fluid stream, the velocity of the fluid stream and the dimensions of the conduit through which the stream is passing. Accordingly, the specific shape, dimensions and length of the first conduit will be determined by the properties of the feed stream be processed. Preferably, the conduit is of a size such that the fluid is stabilised in a transient flow regime, thus keeping the droplets of the dispersed fluid phase active, A particularly preferred arrangement is for the first conduit to comprise a regular tube having an internal helix in order to provide the helical flowpath.

The length of the first helical flowpath within the first conduit should be sufficient to allow the fluid flow to stabilise in the required flow regime, most preferably a transient flow regime. The nature of the fluid stream, its components and the flow regime of the fluid being processed in the method will determine the length of the first helical flowpath. The first helical flowpath is of sufficient length to allow the time for the centrifugal separation of the lighter fluid phase from the heavier fluid bulk phase. If the required flow regime can be established quickly, the first helical flowpath will be correspondingly short.

Preferably, the pitch of the first helical flowpath remains constant throughout its length.

The apparatus is preferably provided with a feed conduit, into which the multiphase fluid stream to be separated is forced, prior to entering the first conduit. The apparatus preferably comprises a means for establishing a rotating fluid flow in the feed conduit. Preferably, the feed conduit comprises a tangential opening, through which the feed stream is forced, the arrangement of the tangential opening causing the fluid to rotate as it passes along the feed conduit and be subjected to high centrifugal forces providing an initial region of separation of the phases before the fluid enters the first conduit.

The apparatus further comprises a second conduit, in which separation of the different phases of the fluid stream takes place. The second conduit also comprises a helical flowpath extending therein. In a preferred arrangement, the second conduit comprises a tube having a helix extending longitudinally therein to provide a second helical flowpath. Preferably, the pitch of the second helical flowpath increases in the direction of flow along the second flowpath. The increase in the pitch may be in a stepwise or a continuous manner. In a preferred arrangement, the pitch of the second helical flowpath is increased along substantially the entire length of the second helical flowpath within the conduit. The pitch may increase up to 5% for each turn of the second helical flowpath around the longitudinal axis of the flowpath, preferably up to 3%, more preferably about 1% for each turn.

To separate the lighter fluid phase from the heavier fluid phases, a means for removing the lighter fluid phase is provided within the second conduit. Preferably, the means for removing the lighter fluid comprises a collection conduit extending coaxially within the second conduit, the helix extending within the annulus around the collection conduit.

The feed conduit, first and second conduits may comprise separate components of the apparatus. However, in a most convenient arrangement, the feed conduit, first and second conduits are adjacent portions of a single tube, a first helix being provided in an upstream portion of the tube to provide the first helical flowpath and a second helix being provided in a downstream portion of the tube to provide the second helical flowpath. In such an arrangement, the means for removing the lighter fluid may comprise a collection conduit extending coaxially within the single tube, the collection conduit having openings in the portion extending within the downstream or second portion for the collection of fluid.

In many circumstances, the provision of the apparatus with first and second conduits, optionally with a feed conduit, will result in an acceptable centrifugal separation of the lighter and heavier fluid phases. However, should further separation be required, the apparatus may comprise one or more of the following components.

Should further separation be required or desired, a preferred technique is the use of a vortex separation action, which subjects the remaining flow to very high centrifugal forces. Accordingly, in such a case, the apparatus may further comprise a conduit for retaining a vortex, the said conduit being arranged to receive fluid leaving the second helical flowpath. In order to provide the optimum vortex for fluid-fluid separation, the rotational velocity of the fluid stream must be suitably high. Accordingly, if required, the apparatus may further comprise a means for increasing the rotational velocity of the fluid disposed between the outlet of the second helical flowpath and the inlet to the conduit for retaining a vortex. Suitable means for increasing the rotational velocity of the fluid is a third helical flowpath. In order to provide the necessary velocity increase, the cross-sectional area of the third helical flowpath decreases along the length of the flowpath. The decrease in the cross-sectional area may occur in a continuous or a step-wise manner. Preferably, the decrease in the cross-sectional area occurs along substantially the entire length of the third helical flowpath. The third helical flowpath is most conveniently formed within a downstream portion of the same conduit containing the first and second helical flowpaths.

The vortex may be allowed to form within a substantially empty conduit, such as an empty downstream portion of the conduit containing the first, second and, if present, the third helical flowpaths. In some process regimes, it may be necessary to provide a means for stabilising the vortex. In one preferred arrangement, the apparatus further comprises a conduit for collecting the lighter fluid component from the vortex, the means for stabilising the vortex is provided by a tapered portion in the region of the opening of the said conduit.

The apparatus described hereinbefore may conveniently be housed within a single conduit or tube, as already mentioned. Further separation may be provided by way of an essentially gravity separation process. Accordingly, the apparatus may further comprise a vessel for receiving the fluid stream, the vessel having a volume sufficient to reduce the Reynolds number of the fluid stream flow such that fluid entering the vessel may be subjected to gravity separation. In such an arrangement, the single tube or conduit as hereinbefore described may conveniently extend within the vessel. In one preferred arrangement, the apparatus may be modular in design, as described hereinafter, in which a plurality of such conduits may extend within a single vessel.

To aid the gravity separation process within the vessel, the apparatus may regiment the flow by comprising means for inducing a rotational flow in the fluid stream entering the vessel. This will allow efficient gravity separation and prevent cross-flow contamination of the separated phases. This means is most preferably a tangential outlet in the conduit through which the fluid stream is introduced into the vessel. To further aid the separation, the vessel may further comprise means for centralising the rotational flow of fluid within the vessel, for example an inverted cone located coaxially within the vessel. The inverted cone may be provided with a fluid guide extending helical along its outer surface in the direction of fluid flow.

To remove the lighter fluid components from the heavier phases within the vessel, the apparatus may further comprise a conduit extending coaxially within the vessel, the conduit having openings therein through which lighter fluid components may leave the fluid stream. In a preferred arrangement, the conduit has an outlet for the lighter fluid components within the vessel, the outlet being disposed upstream of the fluid stream inlet.

The fluid remaining in the vessel will consist essentially of heavier fluid components. The apparatus may further comprise a heavier fluid collection zone, a heavy fluid collection conduit being disposed centrally within the collection zone, the conduit having a plurality of openings therein to collect the heavier fluid.

Should the fluid feed stream comprise any solid components, this will remain in the apparatus, passing in the downstream direction. In such cases, the apparatus may further comprise a solids collection zone and means for removing solids from the collection zone, the means removing solids on an intermittent or a continuous basis.

As mentioned above, the apparatus is particularly suited to being constructed on a modular basis. In particular, the assembly comprising the first and second conduits, and if present the conduit for housing a fluid vortex and any means provided to increase the rotational velocity of the fluid stream, may be housed within a single conduit, representing a single separation assembly module. Accordingly, in a further aspect, the present invention provides an apparatus for separating a multiphase fluid stream comprising a heavier fluid component and a lighter fluid component, the volume flowrate of the multiphase fluid stream being subject to variation over time, the apparatus comprising a plurality of separation assemblies as hereinbefore described and operable to accommodate different fluid flowrates; the apparatus further comprising means for selectively operating one or more separation assemblies according to the volume flowrate of the multiphase fluid stream.

The apparatus may be operated with one module, a selection of modules or all separation assemblies being in use. In this way, individual separation assemblies may be brought on- and off-line as the volumetric flowrate of the stream varies. This is particularly effective when the individual separation assemblies are sized to accommodate different fluid flowrates. Preferably, the apparatus comprises a means for feeding a purge fluid to each separation assembly, in order to allow each separation assembly to be purged and cleaned before being brought on- and off-line.

If a gravity separation stage is required, the modular assembly may further comprise a separation vessel as hereinbefore described, each of the separation assemblies extending within the separation vessel.

In one use of the modular apparatus of the present invention, a plurality of modular separation units may be provided, each comprising a plurality of separation assemblies of varying sizes. Such a group of units may be clustered around a wellhead location or in an oilfield, for example at a surface or a subsea location, in order to serve a group of wells.

The helical separation system of the present invention presents a particular problem when it comes to start-up and shut-down, if the conduits for the lighter fluid produced in the process are not to be contaminated with heavier fluid components. This problem is solved by the start-up and shut-down methods forming further aspects of the present invention.

Accordingly, the present invention provides a method for starting up a helical separation system for operation in separating a multiphase fluid stream comprising a heavier fluid component and a lighter fluid component, the method comprising feeding to the helical separation system a first fluid stream consisting essentially of the heavier fluid component; when the fluid velocity within the helical separation system has reached the minimum operating velocity for the multiphase fluid stream, replacing over a period of time the first fluid stream with the multiphase fluid stream to be separated.

A method for shutting down a helical separation system from normal operation in which a multiphase fluid stream comprising a heavier fluid component and a lighter fluid component is being fed to the helical separation system, comprises the steps of introducing a first fluid stream consisting essentially of the heavier fluid component into the multiphase fluid stream feed to over time to replace the multiphase fluid stream; when the fluid feed consists of the first fluid stream, reducing the fluid feed flowrate to zero.

The helical separation system is preferably left full of the first fluid after the fluid feed flowrate has been reduced to zero. In this way, the aforementioned start-up method may be employed without delay and in the most optimum manner to achieve normal operating conditions with the minimum of contamination of the lighter fluid streams.

The start-up and shut-down procedures of the present invention are of particular advantage when the helical separation system is arranged in the modular format discussed hereinbefore and operated using a varying selection of helical separation modules to accommodate different fluid flowrates and compositions.

Embodiments of the present invention will now be described, by way of example only, having reference to the accompanying drawings, in which.

Figure 1:
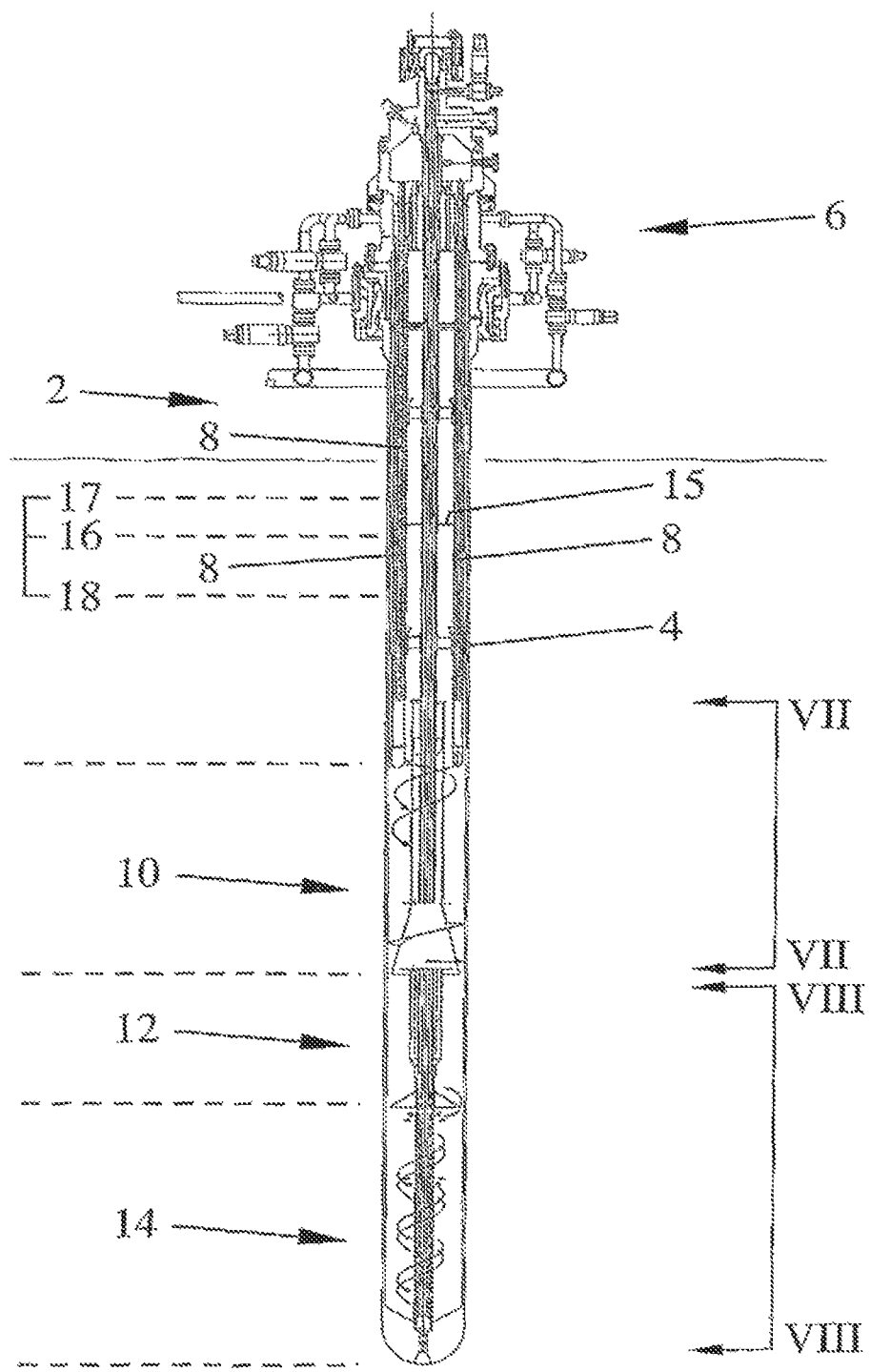
FIG. 1 is a cross-sectional view of a complete separation apparatus according to an embodiment of the present invention.

Referring to FIG. 1, there is shown a separation assembly, generally indicated as 2. The assembly is shown arranged substantially vertically at the seabed, with the lower portion of the assembly extending beneath the seabed. This is one convenient arrangement for locating the assembly, in particular adjacent a subsea wellhead assembly. In this way, existing wellhead assemblies can be provided with the separation assembly of the present invention, without significant modification of the wellhead installation.

The separation assembly 2, is formed around a generally cylindrical, tubular housing 4. The housing 4 is most conveniently a section of commercially available conductor casing. The conductor casing is supplied in a range of sizes, including the nominal sizes of 42 inches, 36 inches, 30 inches and 20 inches (108 cm, 92 cm, 76 cm and 50 cm). The housing 4 may be constructed from a section of the conductor casing, with the diameter being selected to accommodate the volumetric flowrate of the fluid stream to be processed. The embodiments shown in the accompanying figures and described hereinafter are concerned with fluid separation at an undersea location. However, the method and apparatus, with only minor modifications, may also be applied to surface-bound conductors or to platform conductors.

The separation assembly 2 comprises a plurality of discrete components. An inlet and outlet assembly 6 is connected to the upper end of the housing 4, for supplying fluid to the assembly for separation and through which the separated fluid streams are removed. The assembly 2 further comprises a plurality of helical separation, assemblies 8 extending within the housing 4, in which the first stage of separation of lighter fluid components from heavier fluid components is carried out. The remaining portion of the housing 4 is arranged to provide further stages of separation, comprising a fluid stabilisation region 10, a second fluid-fluid separation stage 12, and a final fluid-solid separation and recovery stage 14. Each of these components will be discussed in more detail below.

An operating light fluid/heavier fluid interface 16, a maximum high level 17 and a minimum low level 18 for the fluid within the housing 4 are represented in FIG. 1 and are shown as lying along the length of the helical separation assemblies 8, such that they all He above the lower or downstream end of the helix assemblies.

Figure 2:
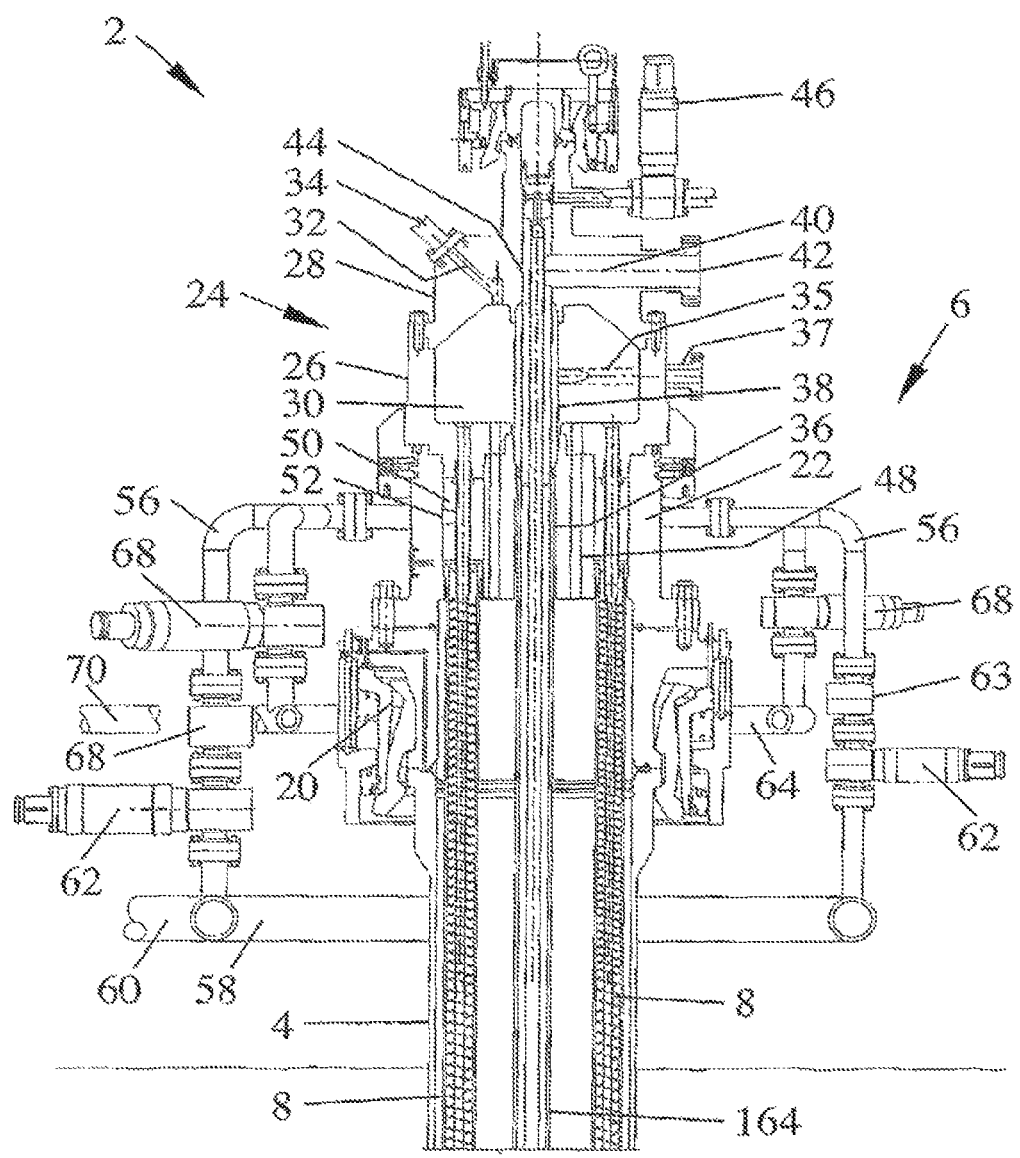
FIG. 2 is a cross-sectional view of the upper portion of the separation apparatus of FIG. 1.

Referring to FIG. 2, the inlet and outlet assembly 6 is mounted on the upper end of the housing 4 by means of a connector 20 of conventional design. The inlet and outlet assembly 6 comprises a generally cylindrical inlet body 22. A cap assembly 24 is mounted on the upper end of the inlet body 22 and comprises a lower cap 26 and an upper cap 28, which together define a gas-liquid separation zone 30, in which gas is removed from liquid present in the zone 30. A vent for the gas is provided by means of a bore 32 extending obliquely through the upper cap 28, which is in turn connected to a gas recovery conduit 34 by a flange of conventional arrangement. A lateral bore 35 is formed in the lower cap 26 and connects to a fluid conduit 37. An axially central bore 36 extends through the inlet body 22, connecting the inner region of the housing 4 with a fluid mandrel 38 extending through the gas-liquid separation zone, which in turn connects with a laterally extending bore 40 through the upper cap 28. Liquid may be removed through this arrangement, to be drawn into a liquid conduit 42, which is connected to a suitable line (not shown) by means of a conventional flange assembly. A coaxial bore 44 extends through the upper cap 28 and provides an opening for the removal of solid material, such as silt, from the assembly, for chemical injection, or for monitoring purposes. A valve 46 is shown connected to the coaxial bore 44 in FIG. 2.

Turning again to the inlet body 22, a plurality of liquid conduits are provided in the form of longitudinal bores 48 spaced around the central bore 36. The liquid conduits provide a direct connection between the gas-liquid separation zone 30 and the upper region of the interior of the housing 4, through which fluids may pass, as required.

Figure 3:
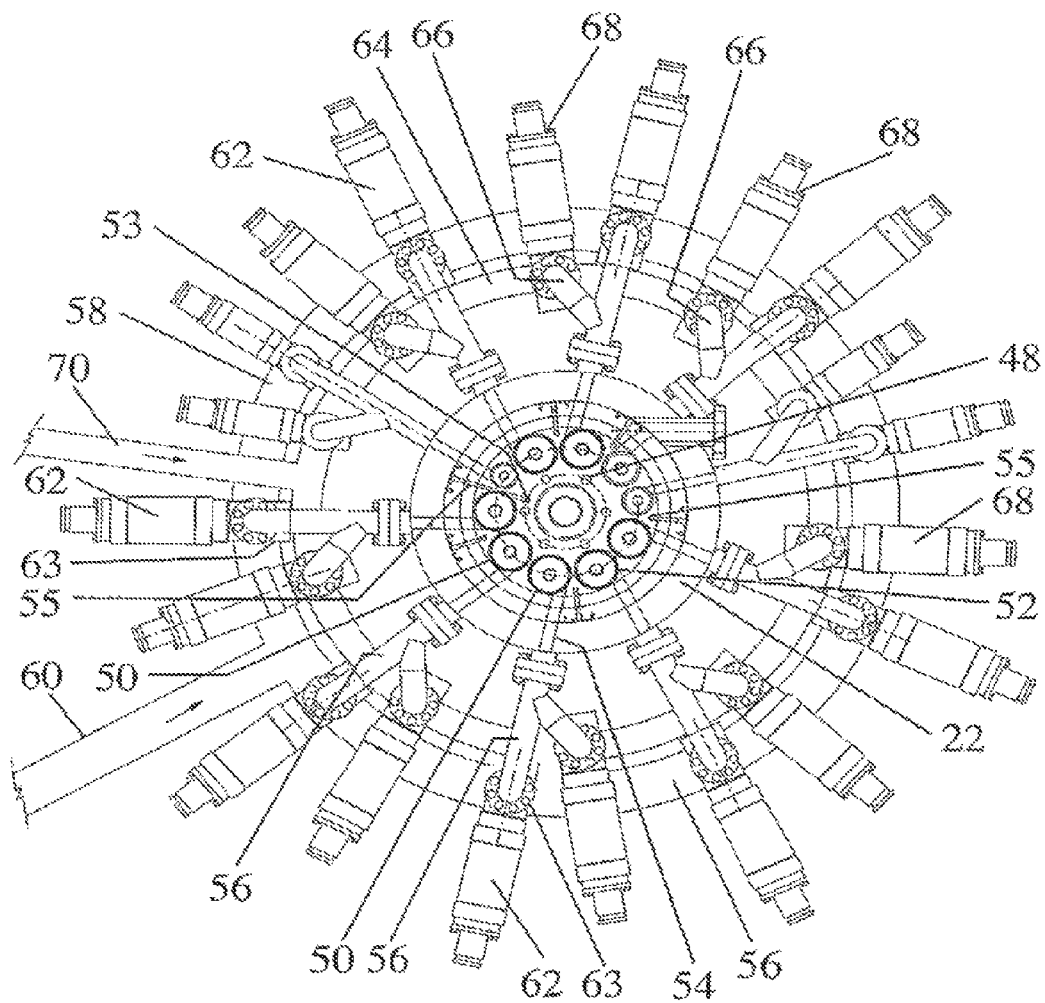
FIG. 3 is a plan view of the separation apparatus of FIG. 1.

The inlet body 22 is provided with a further set of longitudinal bores 50 spaced around and radially outwards of the central bore and the longitudinal bores 48. As will become apparent, the bores 50 provide the feed conduit for each helical separation assembly 8. Each of the longitudinal bores 50 is connected at its lower opening to a respective helical separation assembly 8, details of which are provided hereinafter. The arrangement of the longitudinal bores 50 are their associated helical separation assemblies 8 is shown in plan view in FIG. 3. As shown in FIG. 3, each of the longitudinal bores 50 is provided with a tangentially arranged inlet 52, from which extends a radial bore 54. An inlet conduit 56 is connected to the end of each radial bore 54 by means of a conventional flange assembly. Each inlet conduit 56 is connected to a fluid inlet header 58, shown in FIG. 3 as a circular pipe extending around the upper portion of the assembly. A fluid feed conduit 60 connects to the fluid inlet header 58, through which a multiphase fluid stream to be processed may be fed. The flow of fluid from the fluid inlet header 58 to each inlet conduit 56 is controlled by way of a valve 62. As shown in FIG. 3, each fluid inlet conduit 56 is provided with its own valve 62 and a one-way check valve 63 to prevent any back flow occurring. This provides for independent control of each fluid inlet conduit 56 and the flow of fluid to each helical separation assembly 8. In this way, the assembly is operable to accommodate the greatest variations in the flowrate and composition of the fluid feed stream. It will be appreciated that alternative arrangements are possible, in which a single valve is used to control the flow of fluid to two or more helical separation assemblies 8, albeit with a reduction in the freedom of operation. Such an arrangement may be employed, for example, in situations where only limited variations in the flowrate and/or composition of the fluid feed stream are anticipated during the working life of the installation.

Radial ports 55 extend through the inlet body 22 and connect with respective lines 53, which extend to an appropriate position within the housing 4. These sire employed for fluid injection, fluid sampling or process monitoring operations.

A fluid purge system is also shown in FIG. 3 and comprises a similar arrangement to the fluid inlet system described above, including a circular purge fluid header 64 having a purge inlet conduit 66 extending to each fluid inlet conduit 56. The operation of the fluid purge system is to provide a flow of purge fluid, typically water, to each helical separation assembly, as it comes on- and off-line. A valve 68 is positioned in each purge inlet conduit 66, in order to provide independent control of the purging of each helical separation assembly 8. Again, two or more helical separation assemblies 8 may have their purging controlled by a single valve. A purge fluid feed conduit 70 supplies purge fluid to the purge fluid header 64.

While referring to FIG. 3, it is convenient to note the arrangement of the helical separation assemblies 8. As shown, the assembly comprises a total of 10 helical separation assemblies 8 of a range of sizes, able to accommodate a range of different fluid flowrates. In the arrangement shown, the assembly comprises one each of a helical separation assembly 8 having a nominal diameter of 4 inches, 5 inches and 6 inches (10 cm, 12.5 cm, and 15.25 cm). In addition, the assembly comprises 7 helical separation assemblies 8 having a nominal diameter of 7 inches (18 cm). The arrangement shown can thus be operated over a wide range of feed fluid flowrates, from the lowest flowrate when the single 4 inch helical separation assembly is on-line, up to a maximum flowrate when all helical separation assemblies are operating. Combinations of the helical separation assemblies 8 may be made to accommodate flowrates between these two extremes.

The arrangement shown in FIGS. 1 to 3 is one in which the feed and purge headers and their respective valves are integral with the inlet and outlet assembly 6. It will be appreciated that an alternative arrangement may be employed, in which the valves and headers are combined in a separate module that is connected to the inlet and outlet assembly 6 by suitable lines. In this way, the valves and their control pipework may be more readily accessible for retrieval and replacement.

It is a significant advantage of the assembly that the number and size of the helical separation assemblies arranged within the housing may be varied to accommodate a particular duty, allowing the design and construction of the overall assembly to be on a largely modular basis. This in turn allows the design, construction, maintenance and repair to be both straightforward and economical.

The construction and operation of the helical separation assemblies 8 will now be described, having reference to FIG. 4, which is a stylised representation of a typical assembly. It will be appreciated that the assembly shown in FIG. 4 is significantly shortened, for ease of reference, the ratio of the overall length to diameter of the helix assembly typically being much greater than that represented in FIG. 4.

Figure 4:
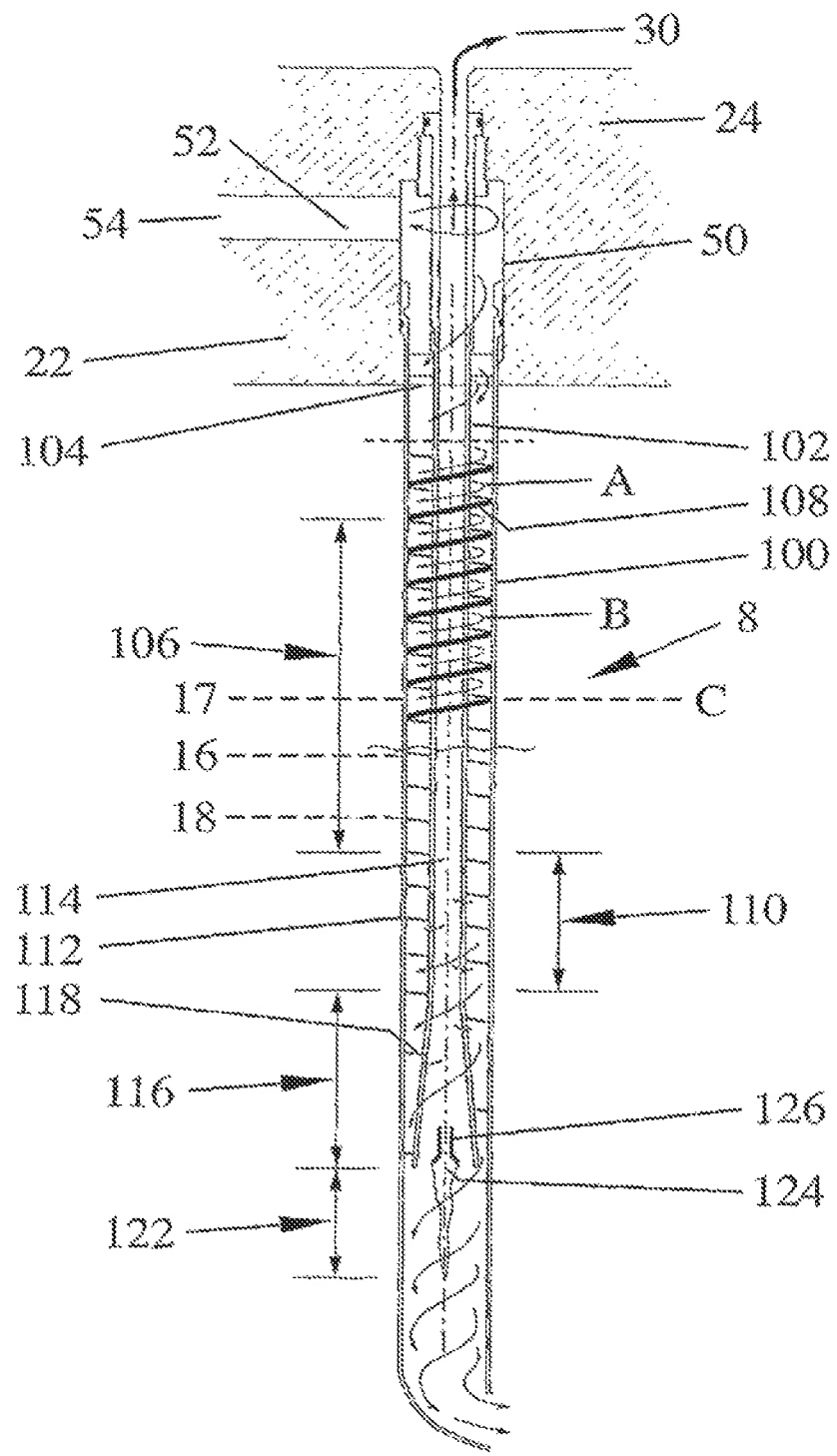
FIG. 4 is a stylised cross-sectional view of a helical separation assembly according to the present invention.

Referring to FIG. 4, a helical separation assembly 8 comprises a generally cylindrical conduit 100, shown in FIG. 4 to extend vertically downwards from the inlet body 22. A light fluid conduit 102 in the form of a generally cylindrical tube extends coaxially within the cylindrical conduit and is open at its uppermost end into the gas-liquid separation zone 30 in the cap assembly 24. An annular cavity is formed around the light fluid conduit 102 between the light fluid conduit 102 and the cylindrical conduit 100. The uppermost region 104 of the annular cavity is empty, allowing for the free passage of fluid. One of the radial bores 54 in the inlet body 22 terminates in a tangential opening 52 in the uppermost region 104 of the cylindrical conduit 100.

The region of the annular cavity adjacent and below the uppermost region 104 is a fluid flow stabilisation region, indicated as 106 in FIG. 4. In this region, a helix 108 is disposed within the annular cavity and extends around the light fluid conduit 102, to form a helical flowpath for fluid moving within the cylindrical conduit. The function of this region is to allow the flow of fluid to stabilise into the required flow regime, by forcing the fluid to flow in a compact helical path. The helix in the flow stabilisation region 106 is formed to provide a stable fluid flow pattern and to allow the phases to centrifugally divide and part, being subjected to multiple gravity and rotational forces before the outlet. In the arrangement shown in FIG. 4, the cross-sectional area of the helical flow path is preferably constant along the entire length of the helix 108. As the helix 108 is disposed within a cylindrical conduit 100, this determines that the pitch of the helix 108 is preferably constant along the length of the region 106. In other arrangements, the pitch of the helix 108 may be varied along its length, in order to provide the required flow pattern at its outlet end.

Figure 5:
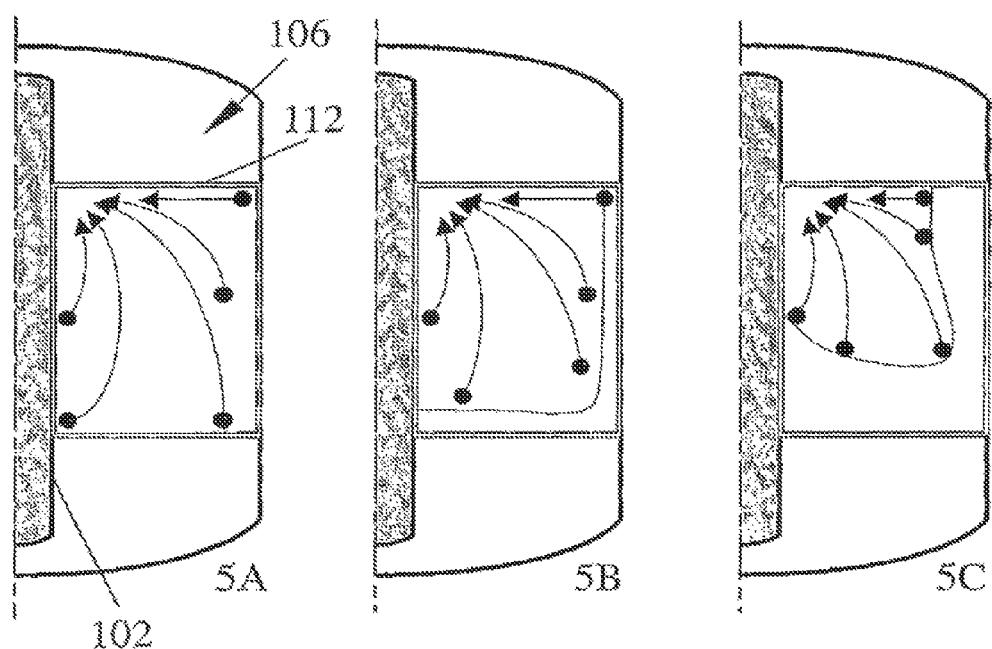
FIGS. 5a to 5c are a stylised cross-sectional view on an enlarged scale of three portions of the helical separation assembly in the regions labelled as A, B and C in FIG. 4.

The movement of droplets of the light fluid phase in the helical fluid flow stabilisation section 106 is represented in FIGS. 5a to 5c.

The end of the flow stabilisation region 106 and the helix 108 is contiguous with a fluid separation region, generally indicated as 110. In this region, a helix 112 is disposed within the annular cavity and extends around the light fluid conduit 102, to form a helical flowpath for fluid moving within the cylindrical conduit. The function of this region is to separate the lighter fluid phase from the heavier fluid phase. The light fluid conduit 102 is provided with a plurality of ports or holes 114. The ports 114 are formed in the inner upper region of the helical flowpath. The light liquid phase is recovered through the ports 114 in the fluid conduit 102 as described hereinafter.

In order to provide the separation of fluid phases in the fluid separation region 110, the cross-sectional area of the helical flowpath is increased along the length of the region 110. In order to provide this increase, the helix 112 is shown in FIG. 4 as increasing in pitch along the length of the fluid separation region 110. The increase is shown as being about a 1% increase in the pitch of the helix 112 for each complete turn around the light fluid conduit 102. The increase in pitch is to allow natural flow of the fluid (as opposed to the forced flow in the upstream helical sections) and to prevent a fluid back pressure arising due to friction forces within the helical channel. If allowed to occur, the fluid back pressure would give rise to a detrimental cross-flow force within the fluid. The increase in the pitch will depend upon the properties of the fluid being processed and is selected to allow the natural movement of the lighter phases into the fluid conduit to occur, while allowing the remaining heavier fluid phases to continue along the helical flowpath.

The end of the fluid separation region 110 and the helix 112 is contiguous with a fluid velocity enhancing region, generally indicated as 116. In this region, a further helix 118 is disposed within the annular cavity and extends around the light fluid conduit 102, to form a helical flowpath for fluid moving within the cylindrical conduit. The helix 118 terminates at the open end of the light fluid conduit 102. The function of this region is to increase the velocity of the fluid remaining in the cylindrical conduit 100 so as to provide a stable vortex in the downstream or lower region of the conduit 100 as described below.

In the fluid velocity enhancing region 116, the helix 118 is shown in FIG. 4 increases in pitch for each turn around the light fluid conduit 102. The increase in the pitch will be determined by the nature of the fluids be separated and the specific separation duty to be performed. A typical rate of increase of the pitch of the helix is about 3% for each turn around the light fluid conduit 102. The portion of the light fluid conduit 102 extending through the region 116 is typically cylindrical and of a substantially constant diameter. An alternative embodiment is to provide the light fluid conduit 102 with a tapered or flared portion, such that its diameter increases through this region in the direction of fluid flow in the annular cavity. This in turn causes the annular cavity between the light fluid conduit 102 and the cylindrical conduit 100 to reduce in cross-sectional area in the downstream direction of fluid flow in the annular cavity.

Figure 6:
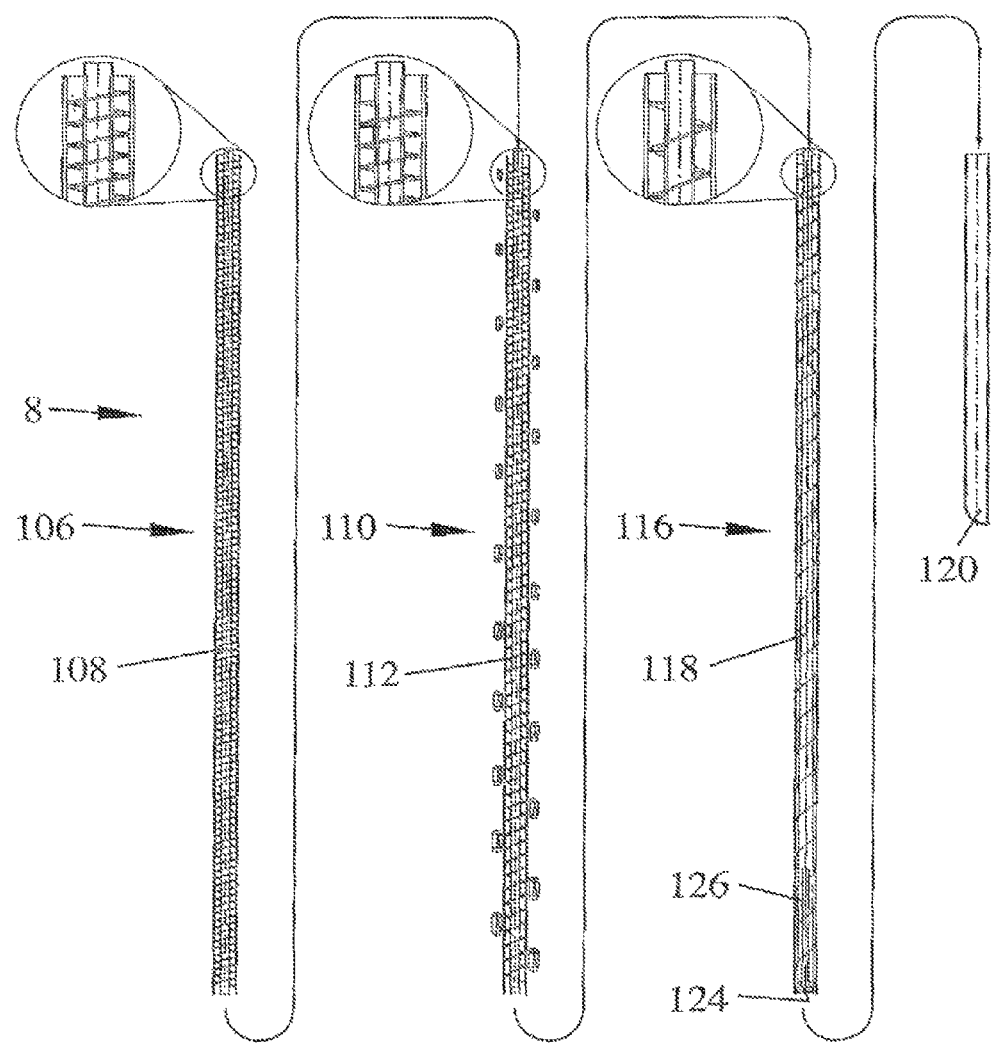
FIG. 6 is a longitudinal cross-sectional view of a helical separation assembly of the present invention.

A cross-sectional view of a typical entire helical separation assembly 8 is shown in FIG. 6, from which it will be appreciated that many separation operations require the length of the three regions 106, 110 and 116 to be many times greater than the diameter of the cylindrical conduit 102. It will also be noted that the helices 108, 112 and 118 are shown as a single helical element extending within the cylindrical conduit 102. This is a preferred arrangement. However, it will be appreciated that each of the helices 108, 112 and 118 may be arranged separately within its own portion of the cylindrical conduit 102, or even within separate conduits. The arrangement shown in FIGS. 4 and 6 is advantageous when applying the helical separation assembly 8 on a modular basis, as described. For certain fluid separations, double helix arrangements may be employed, comprising two helical paths between the conduits 100 and 102.

As noted above, the helix 118 within the fluid velocity enhancing region 116 terminates at the end of the light fluid conduit 102. The cylindrical conduit 100 is provided with an oriented and angled outlet 120 at its lower, downstream end, details of which are described hereinafter. The downstream portion of the cylindrical conduit 100 extending from the end of the light fluid conduit 102 to the outlet 120 of the cylindrical conduit 100 is a substantially empty volume and provides a vortex region, generally indicated as 122. As will be described below, a vortex is established in this region extending in the downstream direction from the end of the light fluid conduit 102. To capture the created vortex, a vortex guide, in the form of an inverted cone 124 and a vortex tube 126 are disposed within the end portion of the light fluid conduit 102, as shown more clearly in FIG. 6.

The helical separation assembly shown in FIGS. 4 and 6 may be operated as a self contained separation system. Alternatively, if further separation, such as polishing, is required, the helical separation assembly may be used in conjunction with the further separation systems and method described below, most suitably in an assembly as shown in the accompanying figures.

Figure 7:
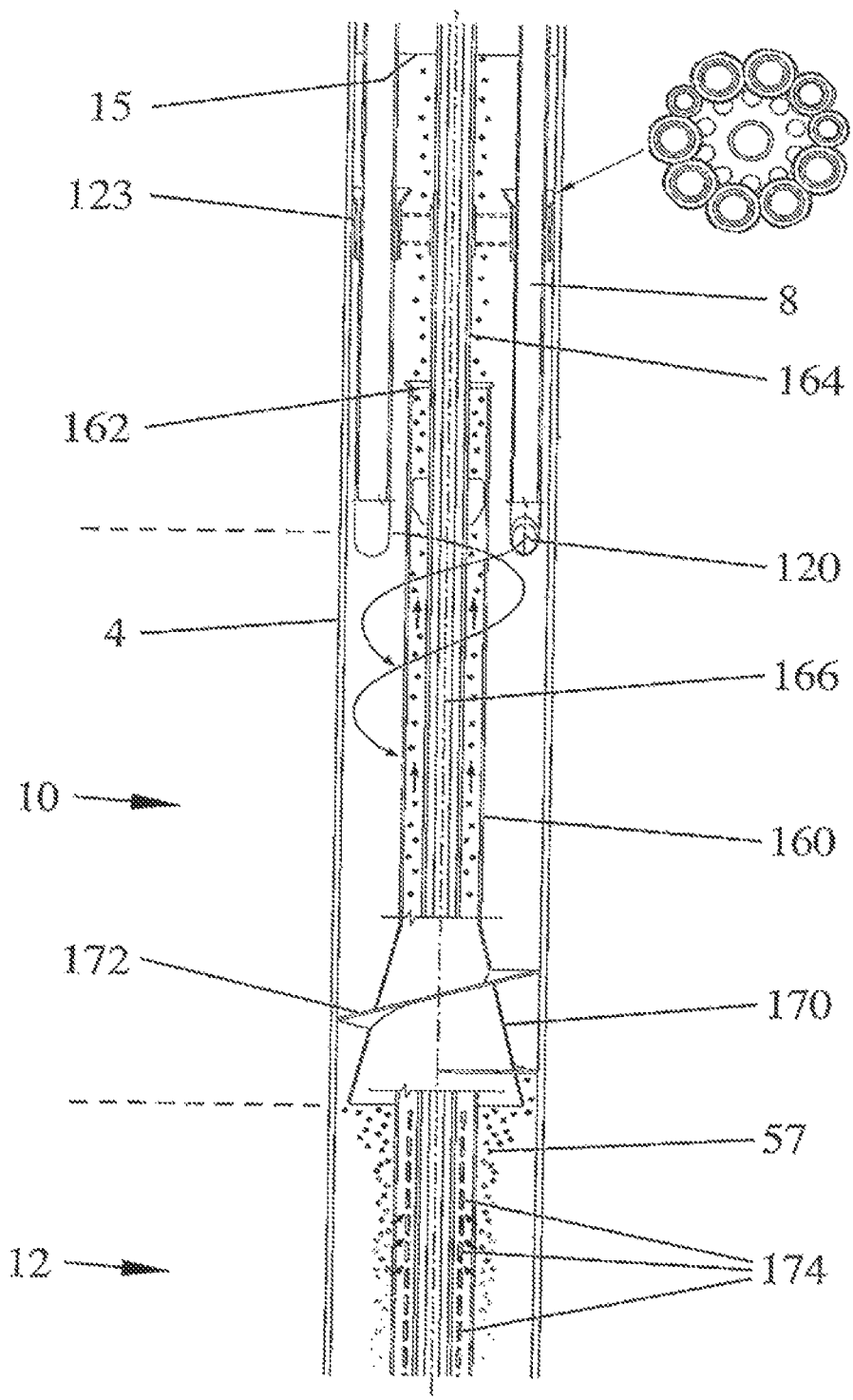
FIG. 7 is a longitudinal cross-sectional view of the portion of the assembly of FIG. 1 along the line VII-VII.

Referring to FIG. 7, there is shown a cross-sectional view of the portion of the assembly of the embodiment of the present invention immediately downstream of the outlet 120 of the helical separation assembly 8. As shown in FIG. 7, a plurality of helical separation assemblies 8 (two of which are visible in FIG. 7) extend downwards within the housing 4 and are retained in position by a baffle plate guide assembly 123. A plurality of baffle plate guide assemblies 123 may be provided, depending upon the length of the helical separation assemblies 8 and their relative dimensions. The baffle plate assemblies 123 provide guidance and spacing to the helical separation assemblies. In addition, they serve to disperse any large gas bubbles that may be present in the bulk fluid, as a result of gas floatation being employed.

The outlet 120 of each helical separation assembly 8 is oriented so as to direct fluid leaving the conduit in a downwards tangential direction, in order to create a wide vortex flow regime, as described below. A secondary light fluid conduit 160, in the form of a generally cylindrical tube, extends coaxially within the housing 4 and has its upper end open to form an outlet 162, It will be noted that the outlet 162 is above, the outlet 120 in the lower end of each helical separation assembly 8. The rotating flow below the outlets will initially consist of cross-flows, until it has stabilised.

The light fluid conduit 160 acts as a cowling to assist any light fluid droplets to move up through this unstabilised fluid region 10.

A heavy fluid conduit 164 extends coaxially within the secondary light fluid conduit 160 up to and coaxially through the fluid mandrel 38, which is connected at its upper end to the liquid conduit 42, as shown in FIG. 2.

A solid/injection conduit 166 extends coaxially within the heavy fluid conduit 164 and is connected at its upper end to the coaxial bore 44 in the upper cap 28, as shown in FIG. 2. The flow of material through the solid/injection conduit 166 is controlled by the valve 46, also shown in FIG. 2.

An inverted cone 170 is disposed around the secondary light fluid conduit 160 and spaced from the lower ends of the helical separation assemblies 8. A helical vane 172 is provided on the conical surface of the inverted cone 170. The region within the housing 4 between the lower ends of the helical separation assemblies 8 and the downstream or lower end of the inverted cone 170 is a fluid flow re-stabilisation region, generally indicated as 10 in the figures, the purpose of which is to establish a slower rotational flow pattern of fluid flowing downwards in this region from the outlets 120 of the helical separation assemblies 8. The inverted cone 170 is of such a length and angle to provide a sufficient reduction in the annular flowpath between the housing 4 and the secondary light fluid conduit 160 to create a higher rotational annular velocity of the fluid to effect a final separation of the lighter and heavier fluid phases in the next region of the assembly.

The region of the housing 4 immediately downstream or below the inverted cone 170 is a second fluid-fluid separation stage, generally indicated as 12 in the figures. In this region, the remaining lighter fluid phases are finally removed from the assembly. To achieve this, the secondary light fluid conduit 160 is provided with a plurality of ports or holes 174 along its length from inside the inverted cone 170, through which the lighter fluid phases may enter the conduit 160 and pass along the annular cavity between the light fluid conduit 160 and the heavy fluid conduit 164. It will be noted that the secondary light fluid conduit 160 is closed at its lower end 161, as shown in FIG. 8.

Figure 8:
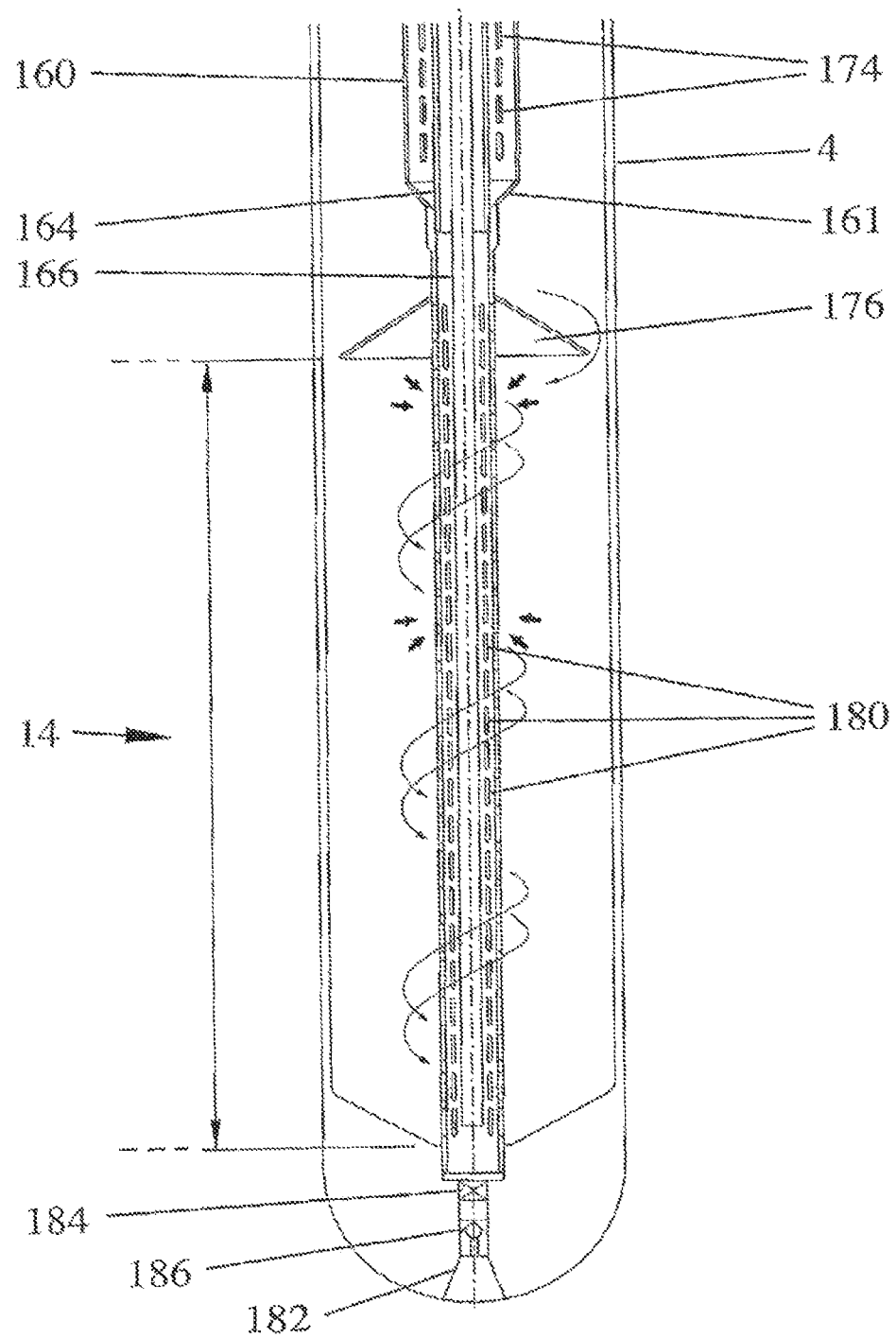
FIG. 8 is a longitudinal cross-sectional view of the portion of the assembly of FIG. 1 along the line VIII-VIII.

Referring to FIG. 8, there is shown a cross-sectional view of the downstream or lower portion of the separation assembly. The final region in the assembly is the final fluid-solid separation and recovery stage, generally indicated as 14 in the figures. A conical vane 176 is disposed at the downstream end of the second fluid-fluid separation stage 12 and provides a barrier to the lighter fluids in the central annulus and ensures only the heavier fluid components and solids in the outer annulus continue in the downwards flow direction. The conical vane 176 marks the upstream end of the final fluid-solid separation and recovery stage 14. The portion of the heavy fluid conduit 164 extending into this final region 14 is perforated by a plurality of ports 180, through which the heaviest fluid phases are withdrawn.

The solid/injection conduit 166 extends to the end region of the heavy fluid conduit 164, as shown in FIG. 8. Means may be provided to withdraw solid material, such as silt and sediment, through the solid/injection conduit 166, for example by means of a reduced pressure or vacuum suction. Alternatively, the solid/injection conduit 166 may be used to inject active components into the fluid in the housing, for example to enhance the separation of the fluid phases.

The lower end of the housing 4 is provided with a bore 182, in which are located an isolation plug or plugs 184 and a check valve 186, both of conventional design. The bore 182 may be used to provide jetting or circulation for seawater, muds or cements when installing the housing 4 into the seabed.

The operation of the assembly in the accompanying figures will be described in relation to the separation of a two phase mixture of oil and water. Such a mixed phase stream is typical of the water recovered from the production fluids of a subterranean well. Typically in such a stream, the oil is suspended as droplets in the bulk aqueous phase, which are not susceptible to coalescence and separation using the conventional techniques of gravity separation and are of insufficient mass to segregate under low centrifugal forces. To be suitable for reinjection into an underground formation, the oil must be removed from the water to a concentration below 400 ppm. This is achieved using the method and apparatus of the present invention in the embodiment shown in the accompanying figures as follows:

The mixed phase oil/water stream is fed to the assembly 2 through the fluid feed conduit 60 and enters the fluid feed header 58, from where it is distributed to one or more helical separation assemblies 8 through the respective inlet conduit 56, the flow through which is controlled by the respective valve 62 and one-way check valve 63. This allows the general flow to be segregated and divided into manageable portions for distribution to respective helical separation assemblies. As described above, the number and combination of the helical separation assemblies 8 to be used is selected to match the volumetric flowrate of the feed stream to be processed. As noted, it is an advantage of the assembly of the present invention, in particular as shown in the accompanying figures, that a wide range of volumetric flowrates may be accommodated without any reduction in the efficiency of separation. Indeed, the ability to select a combination of different sized helical separation assemblies allows the system to be tailored to a very wide range of fluid compositions and flowrates, while allowing the separation processes to operate under their optimum conditions and at a high efficiency.

From each inlet conduit 56, the oil/water stream enters the respective radial bore 54 in the inlet body 22, through the tangential opening 52 in the uppermost portion of the cylindrical feed conduit of the respective helical separation assembly 8, as shown in FIGS. 3 and 4. The selected fluid stream enters the cylindrical feed conduit tangentially, where coarse cyclonic separation occurs. This allows the general phase masses to be divided and begin to separate and to perform the stream into a plurality of discrete phases before the fluid enters the helical flowpath. As the operation of each helical separation assembly is identical, with the only difference being the size of the assembly and its volumetric throughput, the operation of just a single helical separation assembly 8 will be described for clarity.

The oil/water stream entering the helical separation assembly 8 is caused to flow in a rotating pattern as it descends the uppermost region 104, as viewed in FIG. 4. The oil/water then enters the fluid flow stabilisation region 106 and enters the helical flowpath formed by the helix 108. The function of the uppermost region 104 and the fluid flow stabilisation region 106 is to generate a uniform, rotating fluid flow pattern in the oil/water stream. The passage of the stream through the various conduits and pipes upstream of the separation assembly 2 will provide the stream with a turbulent flow regime, in which the Reynolds number is significantly above the critical Reynolds number upon entry into the helical separation assembly 8. Such a turbulent flow pattern will not provide a high efficiency of separation of oil droplets from the water. Accordingly, the uppermost region 104 and the fluid stabilisation region 106 are operated to stabilise the. flow regime such that the Reynolds number is below the critical number. In other words, the Reynolds number of the fluid flow is brought below the value at which turbulent flow arises. Preferably, the flow stabilisation region 106 is of sufficient length for the fluid flow regime to become laminar. At least, the flow regime should be in the transitional state, preferably with a Reynolds number towards the lower end of the transitional range.

In the flow stabilisation region 106, the transitional state and the compact helical flow pattern will generate high centrifugal forces within the fluid, forcing even the smallest droplets of fluid to migrate according to their respective densities. This action encourages coalescing of the small droplets into larger drops, which in turn, due to their larger masses, experience a larger force and accelerate the separation of the phases. An advantage of a forced flow in the flow stabilisation region 106 is that it significantly increases the critical Reynolds number, allowing the Reynolds number to be considerably higher but still within the laminar flow regime than for flow in an open stream. This in turn allows the fluid to flow at a significantly higher velocity along the helical path.

Upon leaving the fluid flow stabilisation region 106 the oil/water stream immediately enters the upper end of the fluid separation region 110 and the helical flowpath formed by the helix 112. In this region, the major portion of the oil droplets are large enough to collect and to be separated from the water in the oil/water stream and removed from the stream. The action of the high centrifugal forces on the minute oil droplets and separation action at various stages as the flow is forced through the helix is represented diagrammatically in FIGS. 5a to 5c. In the upper regions of the fluid separation region 110, as shown in FIG. 5a, the rotational flow of the fluid stream causes the lighter oil droplets to migrate to the upper, inner region of the helical flowpath, as viewed in FIG. 5a. This movement progresses along the length of the helical flowpath, as shown in FIGS. 5b and 5c. The oil collecting in the upper, inner region of the flowpath flows through the ports 114 in the light fluid conduit 102 and passes upwards in the conduit to the gas-liquid separation zone 30 in the cap assembly 24, as shown in FIG. 2. Any gas present in the oil at this point is collected in the upper region of the gas-liquid separation zone 30 and is removed through the bore 32 and the gas recovery conduit 34. The oil is removed from the cap assembly 24 through the lateral bore 35 in the lower cap 26 and the fluid conduit 37. Any water entrained with the oil and reaching the cap assembly 24 returns to the housing 4 by way of the longitudinal bores 48 in the inlet body 22.

Upon leaving the fluid separation region 110 the remaining liquid, consisting essentially of water with minor amounts of oil, enters the fluid velocity enhancing region 116 and the upper end of the helical flowpath provided by the helix 118. In this region, the rotational velocity of the stream is increased. As a result, the Reynolds number of the stream increases and may approach the critical value. The velocity of the stream is increased sufficiently to produce a stable vortex in the portion of the cylindrical conduit 100 immediately downstream of the end of the fluid velocity enhancing region 116. The vortex is stabilised at the open end of the light fluid conduit 102 and collected with the aid of the inverted cone 124 and the vortex tube 126 in the lower end of the light fluid conduit 102. Under the action of the rotational movement of the fluid in the vortex, the remaining oil droplets migrate to the centre of the vortex and enter the lower end of the light fluid conduit 102, from where it passes to cap assembly 24, as discussed above.

The remaining liquid flows down the cylindrical conduit 100 and leaves through the angled outlet 120 to enter the main volume of the housing 4. In operation, the main body of the housing 4 is filled with liquid, the lower region being filled with water and the upper region being filled with the lighter oil. The entire assembly is operated such that the oil/water interface is above the maximum high level 17 of the cylindrical conduit 100 of the helical separation assembly 8. In the main volume of the housing 4, two actions enhance the separation of any remaining oil droplets from the water. The first action is a straightforward gravity separation, by which the lighter oil droplets are caused to rise within the housing and enter the upper region. The oil collected in this region will leaving the housing 4 through the longitudinal bores 48 in the inlet body 22 to enter the gas-liquid separation zone 30 in the cap assembly 24. The oil is removed from the cap assembly 24 as described above.

The second mode of separation in the main volume of the housing is a further rotational separation. The action of the angled outlet 120 is to induce a slow rotation of the substantially water phase within the lower region of the housing 4. The rotating water stream descends within the housing through the fluid stabilisation region 10. As the water stream passes the inverted cone 170 and the helical vane 172, its rotational velocity is increased, before the water stream enters the further fluid-fluid separation region 12. In this region, the remaining oil droplets are caused to migrate to the centre of the housing 4, where they pass through the ports 174 in the secondary light fluid conduit 160. Within this conduit, the oil droplets move upwards past the outlets 120 of the helical separation assemblies 8 and enter the upper region of the housing 4.

The water leaving the further fluid-fluid separation region 12 will contain only very minor or trace amounts of oil and be suitable for reinjection into a subterranean formation or for disposal in other ways. The water is removed from the assembly in the removal region 14 by passing through the ports 180 in the heavy fluid conduit 164. The water in this conduit flows upwards to the cap assembly 24 and leaves the assembly 2 through the lateral bore 40 and the liquid conduit 42.

Any solid materials, such as sediment or silt, may be collected in the lowermost region of the housing 4 and removed, either periodically or continuously, through the solid/injection conduit 166.

The solid/injection conduit 166 also provides a means for introducing components into the fluids in the housing 4, such as separation enhancers, as may be required to improve the separation efficiency of the overall assembly.

A portion of the water removed from the fluid removal section 14 may be recycled to the inlet conduit 60, in order to adjust the volumetric flowrate of fluid through the assembly. This may be needed, for example, to provide sufficient rotational velocity of the oil/water streams in the helical separation assemblies 8.

Figure 9:
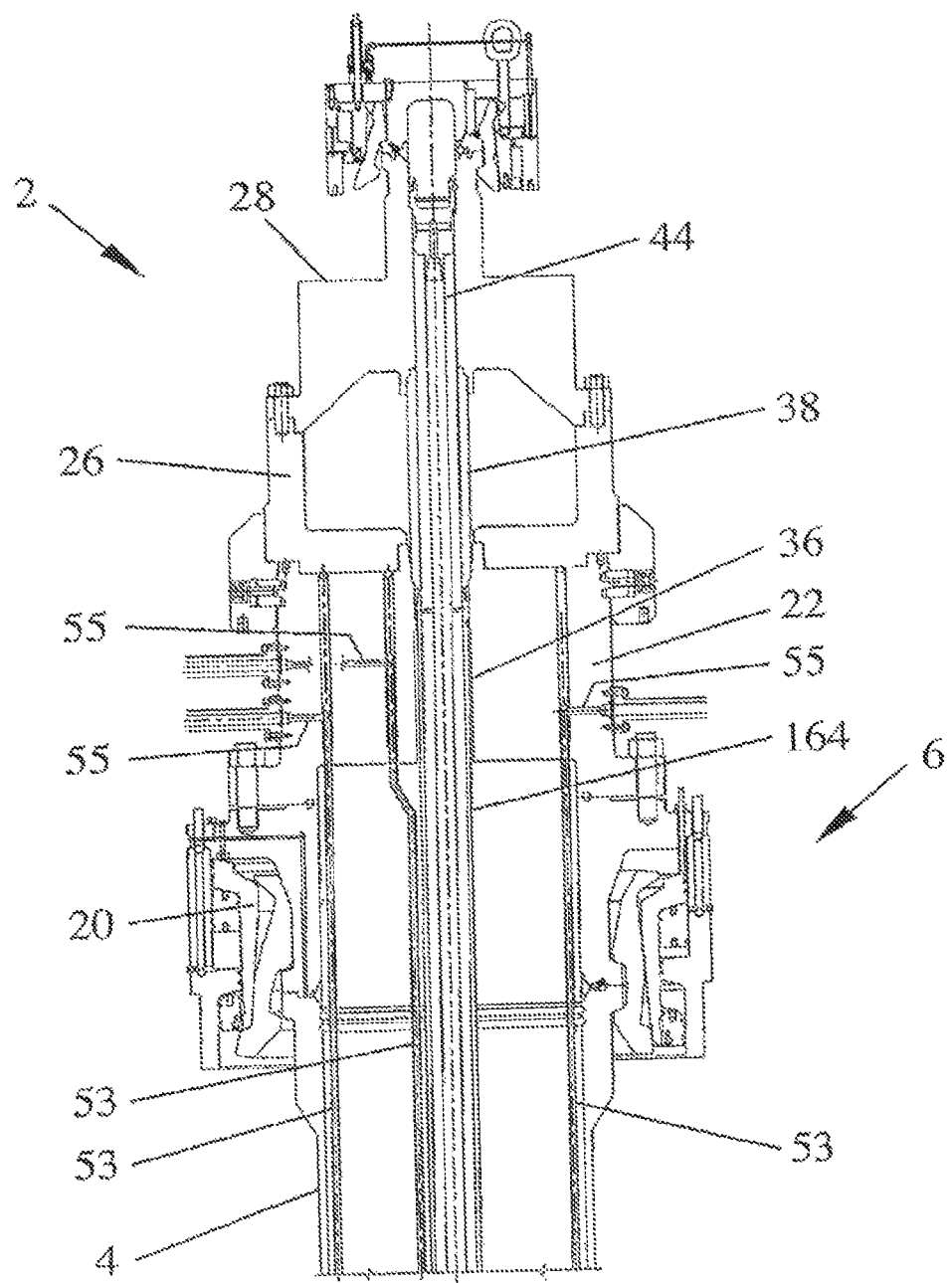
FIG. 9 is a cross-sectional view of the upper portion of the separation apparatus of FIG. 1 along a different axis to that of FIG. 2.

The control and monitoring of the overall system is achieved using an arrangement of injection, monitoring and sample lines. As noted above, the cylindrical inlet body 22 is formed with a plurality of radial bores 55 connected at their inner ends to respective control lines 53. As more clearly shown in FIG. 9, the control lines 53 extend longitudinally in a downstream direction within the housing 4. The radial bores 55 and the control lines 53 may be used to inject components into the bulk fluid phase within the housing, such as additives and separation enhancers. Gas may be injected through one or more of these lines in order to provide a gas floatation system within a liquid bulk phase.

One particular use for the control lines 53 is to determine and monitor the interface between the light fluid phase and the heavy fluid phase within the housing 4. As described above, the light fluid phase will be collected from and rise upstream within the housing to occupy the uppermost regions of the housing, as shown in the Figures. For efficient operation of the separation process, it is necessary to identify the interface between the two phases. In operation, this may be a well defined interface 15. Alternatively, depending upon the nature of the fluids concerned, the interface may be poorly defined. For example, in the case of the separation of oil dispersed in a continuous aqueous phase, the interface may extend over several meters and comprise an emulsion of oil and water.

Figure 10:
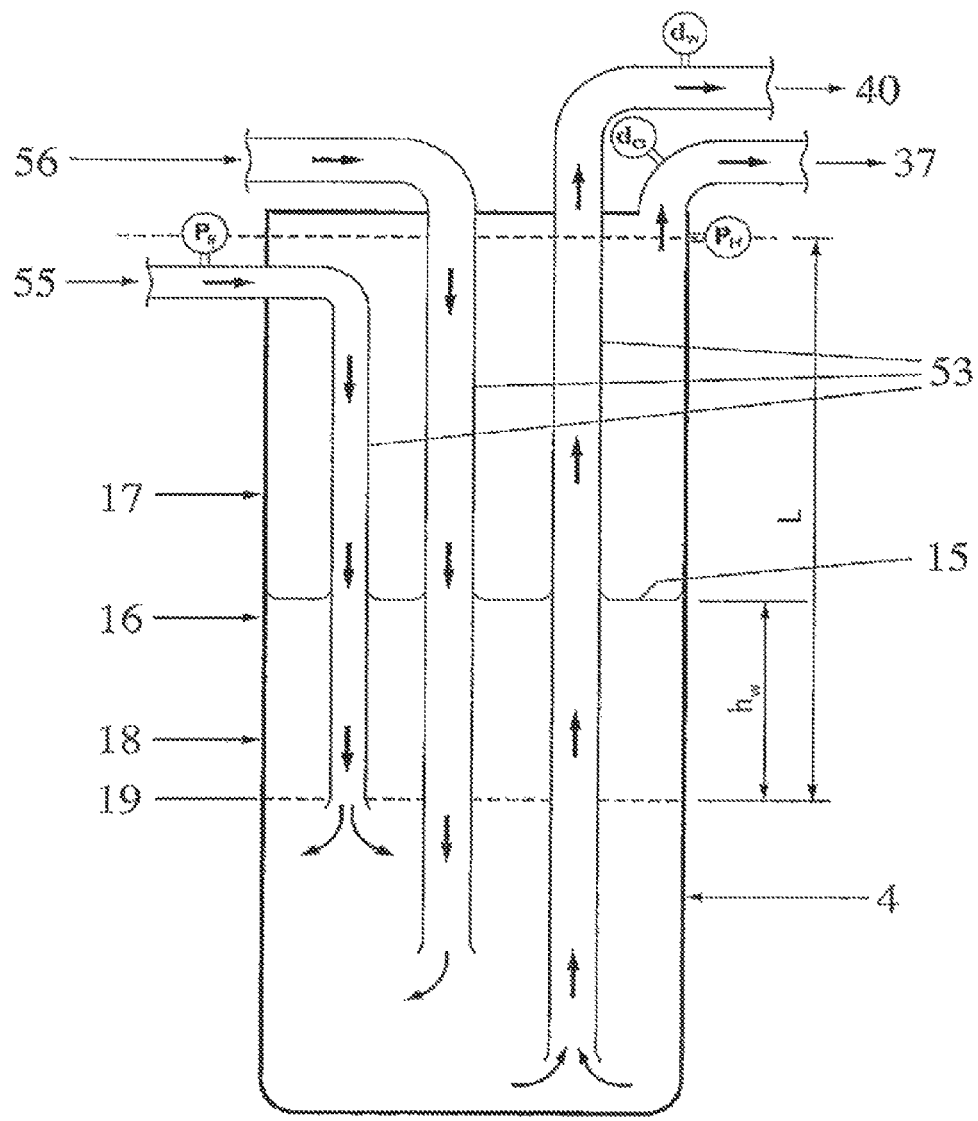
FIG. 10 is a schematic representation of a system of the present invention, indicating how monitoring tubes are employed. to monitor the performance of various regions of the system.

The technique of determining the position of the interface 15 is shown schematically in FIG. 10. A control line 53 is shown extending into the housing 4, the lower end of which defines a datum 19. The pressure Ps of injected fluid in the control line 53 is measured by a sensor. Similarly, the pressure Ph within the housing at its uppermost end is measured. To determine the interface 15 in an oil/water fluid system, clean oil, for example that removed from the light fluid conduit after separation in the assembly, of a known density is introduced into one or more of the control lines 53. The pressure in the control line is measured and compared with the pressure at the exit of the light fluid conduit. The height $h_w$ between the datum 19 and the interface 15 is determined using the formula:

$$h_w = \frac{(P_s - P_h)}{(d_w - d_o)}$$

where $h_w$ is the height between the datum and the interface 15; $P_s$ is the pressure of injected oil in the control line 53; $P_h$ is the pressure in the uppermost end of the housing 4; $d_w$ is the density of water; and $d_o$ is the density of the injected oil. A similar formula is applied to other fluid systems.

A constant feed of light fluid, such as oil, is maintained through the control line 53, in order to allow the system to actively monitor the changes in the interface. In general, the system will be operated with a predetermined operating level 16, as shown in FIG. 10, with a high point 17 and low point 18 for the interface, defining the acceptable operating range of the fluid/fluid interface. Movement of the system outside of this range can be used to trigger an alarm and/or initiate a corrective operation, such as the injection through one or more control lines 53 of a volume of light fluid or heavy fluid. Alternatively, or in addition, one or more of the outlet pumps or inlet chokes around the system may be adjusted, depending upon the correction required. The corrective action may include recycling a portion of the heavier fluid.

As noted above, the arrangement of the present invention is particularly suited for application on a modular basis. In one preferred arrangement, a separation module comprises a helical separation assembly, as described both in general and in specific detail above and shown in the accompanying figures, indicated by the general reference numeral 8. The helical separation assembly may be provided in a variety of different sizes, in particular a range of different nominal diameters. This possible variation in the size of the separation module is an advantage of the present invention by allowing a wide range of fluid flowrates and compositions to be accommodated. There are a number of ways in which the modular approach of the present invention may be applied.

Figure 11:
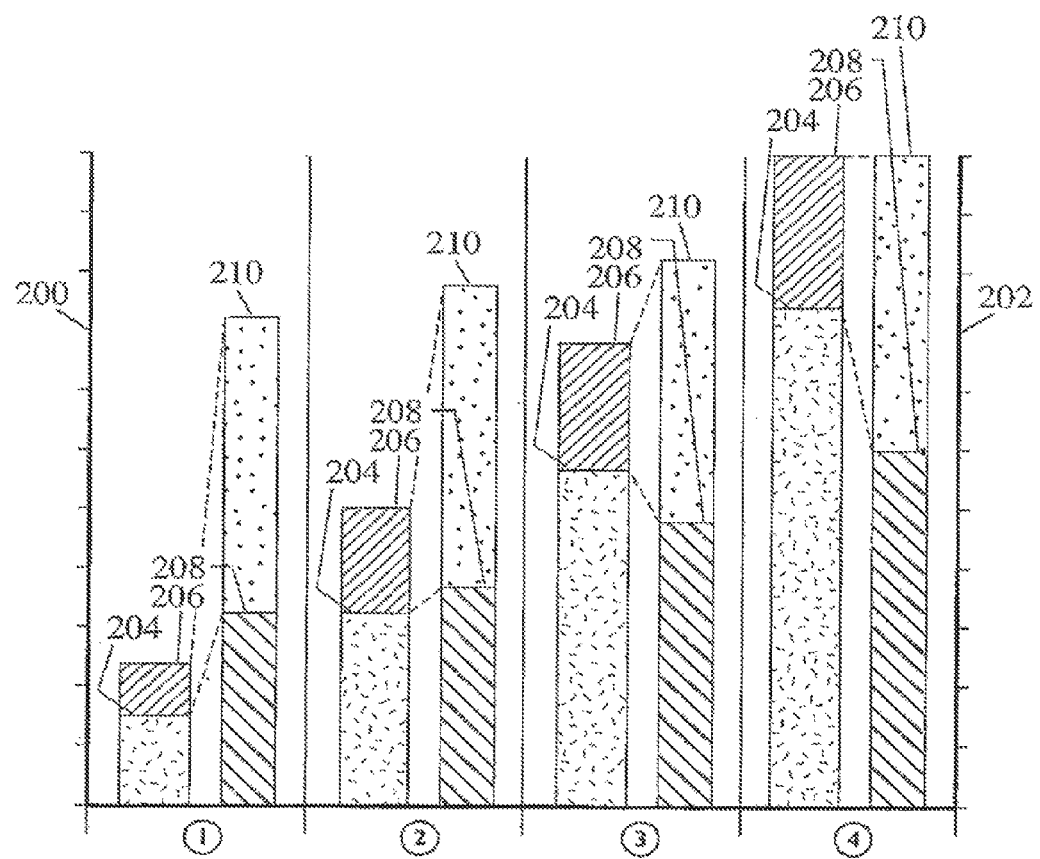
FIG. 11 is a performance histogram showing the operating flow ranges and operating pressure ranges for assemblies of differing dimensions.

First, the larger size helical separation assemblies can accommodate larger fluid flowrates. Referring to FIG. 11, there is shown a graph of the operating flowrates and pressures for a range of helical separation assemblies 8 as shown in the accompanying figures. The operating ranges and parameters are given for helical separation assemblies having nominal diameters of 4, 5, 6 and 7 inches (numbered 1 to 4 in FIG. 11) and for operation in the separation of crude oil droplets from a water stream. Such a stream is typical of the oil-contaminated water streams encountered during drilling and production operations in subterranean oil and gas wells. As a first approach to accommodating a given fluid stream and flowrate, it is merely necessary to select the appropriate size of helical separation assembly, for example from a graph such as FIG. 11.

If the stream to be processed has a flowrate exceeding the maximum operating flowrate of the helical separation assembly, the stream may be split and a plurality of such assemblies may be operated in parallel. A further manner to apply the modular approach of the present invention is to select a plurality Appropriate selection of the sizes of the plurality of helical separation assemblies allows a combination of different sized assemblies to be determined to match the given stream and flowrate.

A complication arises when the flowrate and/or composition of the fluid stream to be processed will vary as the well or wells are brought on stream or shut down and over the working lifetime of the separation assembly. This situation is likely to be encountered in the case of offshore oil and gas wells. It is preferred to provide equipment at such remote locations that can operate for extended periods of time, typically many years, with little or no adjustment or maintenance. A problem arises with separation equipment at such remote locations as a result of the fluid flowrate and composition produced from the well varying over time. Advantageously, the present invention provides a separation system that can be installed and operated to accommodate a range of flowrates and compositions changing over time.

Figure 12:
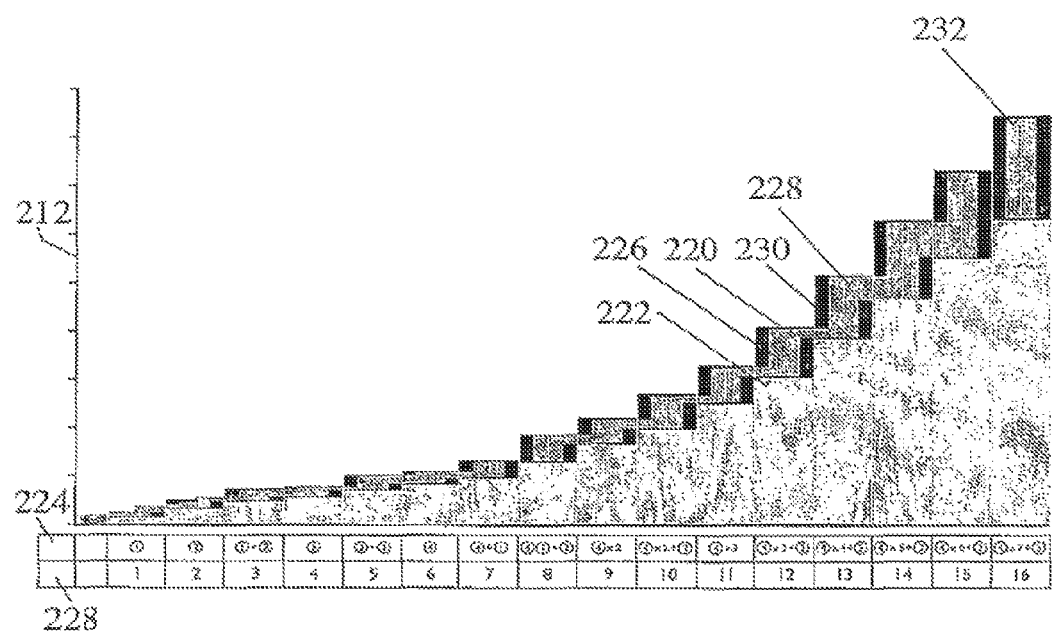
FIG. 12 is a graph indicating the selection of different assembly combinations to accommodate different feed stream flowrates.

An assembly incorporating the concepts of the present invention and adapted to accommodate such changes in the fluid stream over time comprises a plurality of helical separation assemblies 8 of a variety of nominal sizes. As the fluid flowrate and compositions change, the individual helical separation assemblies are brought on- and off-line in the appropriate combination to be matched to the fluid stream being processed and provide optimum separation efficiency. Referring to FIG. 12, there is shown, as an example, a further graph in which the flowrate of an oil-contaminated water stream, such as obtained from the production of oil from a subterranean well, is matched with combinations of the helical separation assemblies 1 to 4 of FIG. 11. As will be seen, at low flowrates, a single helical separation assembly of the appropriate size can be employed. As the flowrate increases, it is necessary to employ combinations of two or more assemblies of the appropriate size. The number and combination of sizes of separation assemblies are selected to match the required total flowrate, while still allowing each individual assembly to operate within its operating range and at its optimum efficiency.

Referring to FIG. 11, there is shown a dual vertical axis histogram. The vertical axis 200 on the right hand side indicates the fluid flowrate for each helix, while the vertical axis 202 on the left hand side shows the pressure differential across a helix. The base of the histogram identifies a single size helical separation assembly. For each helical separation assembly, the vertical column 204 on the left depicts the minimum flowrate to achieve sufficient centrifugal forces within the fluid and the maximum flowrate 206 acceptable to remain below the critical Reynolds number.

The column 208 on the right of each helical separation assembly shows the minimum differential pressure allowable to achieve acceptable centrifugal separation within the flow and the maximum differential pressure 210 to remain below the critical Reynolds number. Failure to operate with the flowrate at the correct pressure differential within the operating band for each helical separation assembly will result in light fluid being carried through the system and polluting the heavier fluid phase collected. This will render the heavier fluid unacceptable for pumping downhole, unless it is recycled to the inlet of the separation system and the lighter fluid phases removed.

Therefore, as the total flowrate increases or decreases, helical separation assemblies cannot be simply opened or closed, as the fluid flow to other open helical separation assemblies could change and be outside the aforementioned operating windows. For the overall system to perform the required separation duty over a wide range of fluid flowrates, intermediate helical separation assembly combinations have to be selected.

Turning specifically to the examples of FIG. 11, at very low flowrates, that is below 1200 BPD, a single helical separation assembly, number 1 in FIG. 11 having a nominal diameter of 4 inches is applied. The optimum operation of the single assembly is achieved using a recirculation of clean water to supplement the low flowrate of the stream to be processed. As the flowrate of the stream to be processed increases, helical separation assemblies 2, 3 and 4 are brought on-line, either alone or in combination. Flowrates of up to 5500 BPD may be accommodated using a single helical separation assembly 4, having a nominal diameter of 7 inches. To be capable of covering a full flow range will require combinations of two or more of the assemblies illustrated in FIG. 11 to be employed.

FIG. 12 shows a histogram with the vertical axis 212 indicating the total fluid flowrate to be accommodated by the assembly 2. The base of the histogram identifies the maximum flowrate step 220 and the minimum flowrate step 222 that can be processed using the combination of helical separation assemblies 224 shown in the steps identified as 225. Each combination of helical separation assemblies has been numbered and the individual assemblies making up the given combination identified. The safe operating range 226 for each assembly combination has been indicated. Thus, a flowrate of 42,400 BPD is accommodated using a combination of seven helical separation assemblies of nominal diameter 7 inches (assembly 4 in FIG. 11) and one assembly of nominal diameter 6 inches (assembly 3 in FIG. 11), identified as assembly combination 16 in FIG. 12.

As will be seen in FIG. 12, the safe operating range 226 selected for each assembly combination overlaps the operating range of the two adjacent combinations. As the total fluid flowrate increases and the maximum operating flowrate of a given assembly combination 228, the operation is switched to the next higher assembly combination, as identified in the steps 225. When the total fluid flowrate drops and approaches the minimum operating flowrate 230 of the combination, operation is, switched to the next lower. assembly combination. In this way, a smooth, continuous fluid separation operation can be achieved from zero fluid flowrate to the maximum total throughput 232 of the complete assembly 2.

As will be appreciated, during the operation of the assembly of the present invention when applied in a modular approach, individual helical separation assemblies are brought on- and off-line, as the fluid flowrate and composition changes. This requires each assembly to be started and shut down. Preferred methods for starting the assemblies and shutting them down are provided as aspects of the present invention.

In order for the required separation to be achieved in the various separation stages of the present invention, it is necessary that the fluid flowrate is above a critical minimum value, as indicated by the value 204 for each helical separation assembly shown in FIG. 11. At flow rates below this critical value, the lighter fluid phases will be not be completely removed and will contaminate the heavier fluid phases produced in the process. This characteristic makes it undesirable simply to shut down and start up the individual separation assemblies using just the fluid stream to be separated. To overcome this problem, it is preferred to bring each helical separation assembly on line using a purge of clean heavy fluid.

As noted above and as shown in FIGS. 2 and 3, the inlet assembly of the system comprises a purge fluid header 64 fed by a purge fluid conduit 70. The flow of purge fluid from the header 64 to each helical separation assembly 8 is controlled by a purge fluid valve 68. When the purge fluid valve 68 for a given helical assembly 8 is opened, clear purge fluid (such as clean water in the case of an assembly separating oil droplets from produced water) is introduced downstream of the valve 62 and check valve 63 controlling the flow of fluid to be processed. At start-up of a given helical separation assembly, the relevant valve 62 and check valve 63 are closed and the purge fluid valve 68 opened, to provide a stream of fluid above the critical minimum flowrate for separation. Once the flow has been established, the valve 62 is opened. It is preferable to have the purge fluid pressure above the fluid stream pressure, in order to ensure that the purge fluid stream has dominance over the fluid stream being processed. In this way, when the valve 62 is opened, the fluid stream will not flow, as the higher purge fluid pressure will keep the check valve 63 closed. As the purge valve 68 is gradually closed, the pressure of the purge fluid entering the radial bore 54 will fall, allowing the check valve 64 to open. In this way, the fluid stream to be processed replaces the diminishing purge fluid, as the purge valve 68 closes, bringing the helical separation assembly 8 fully on line.

To shut down a given helical separation assembly, the opposite procedure is followed. Thus, the appropriate purge fluid valve 68 is gradually opened, supplementing the fluid stream with purge fluid. The check valve 63 prevents a higher pressure down stream of the valve 62 entering the feed fluid system and flowing upstream. The purge fluid, being at a higher pressure, will gradually close the check valve 63, in turn slowly shutting off the flow of feed fluid, until static flow is achieved. The valve 62 is then closed at this point.

The purge valve 68 remains open until sufficient fluid has passed to completely purge the helical separation assembly 8 of all residual fluid being processed. The purge valve 68 is then closed. The helical separation assembly 8 is left containing only clean purge fluid and may be left off line in this state until such time as a further change in the total fluid flowrate requires it to be brought on line.

It is important that the helical separation assemblies 8 are brought offline in a cleaned and purged state, as the start up flowrate of fluid through the assembly 8 will be below the critical minimum flowrate to achieve complete separation. If the helical separation assembly is left containing fluid being processed, this would be flushed into the downstream clean fluid zone upon start up. This would result in contamination of the separated fluid fractions. This contaminated fluid would need to be recycled to the inlet of the assembly 2 to be processed again. This could result in the wellhead production flow having to be reduced or even shut off, until the contaminated fluid has been processed. As will be appreciated, this is not acceptable for the continuous well production process, in particular given the frequency that the combination of helical separation assemblies 8 being brought on and off line would need to change.

The purge fluid feed valve 68 may be a choke, flow control valve, ball or gate valve. The helical separation assembly may be maintained in this state until needed to be brought on-line again.

The operation of the present invention, in particular the embodiments shown in the accompanying figures, has been described in detail in relation to a multiphase stream comprising oil and water. It will be understood that the assembly and method of the present invention may be employed to separate other multiphase liquid-liquid streams. The stream may contain two, three or more phases, which may be separated according the relative densities of the liquids concerned. In addition, the invention may be employed to separate multiphase gas-liquid streams in a similar manner.

What is claimed is:

1. A method for separating a liquid including a heavier liquid component and a lighter liquid component, the method including:

causing the liquid to flow downwardly along a helical flowpath that increases in pitch along the helical flowpath such that a critical Reynolds number for the liquid is elevated, the liquid flowing at a Reynolds number below the elevated critical Reynolds number, the liquid flowing at a sufficient velocity to cause the liquid to separate into the heavier liquid component and the lighter liquid component.

2. The method according to claim 1, wherein the elevated critical Reynolds number is greater than 10,000.

3. The method according to claim 2, wherein the elevated critical Reynolds number is greater than 100,000.

4. A method for separating a liquid including a heavier liquid component and a lighter liquid component, the method including:

causing the liquid to flow downwardly along a helical flowpath extending around a central conduit that increases in pitch along the helical flowpath such that a critical Reynolds number for the liquid is elevated, the liquid flowing at a sufficient velocity to cause the lighter liquid component to move to an inner region of the helical flowpath with the liquid flowing at a Reynolds number below the elevated critical Reynolds number; and collecting the lighter liquid component in the central conduit.

* * * * *